(12) United States Patent
Pan et al.

(10) Patent No.: US 11,656,944 B1
(45) Date of Patent: *May 23, 2023

(54) CODE FUNCTION CHECKPOINT AND RESTORE

(71) Applicant: Amazon Technologies, Inc., Seattle, WA (US)

(72) Inventors: Cheng Pan, Bellevue, WA (US); Calvin Yue-Ren Kuo, Mercer island, WA (US); Jeffrey Tarn, Issaquah, WA (US)

(73) Assignee: Amazon Technologies, inc., Seattle, WA (US)

(*) Notice: Subject to any disclaimer, the term of this patent is extended or adjusted under 35 U.S.C. 154(b) by 22 days.

This patent is subject to a terminal disclaimer.

(21) Appl. No.: 17/107,812

(22) Filed: Nov. 30, 2020

Related U.S. Application Data

(63) Continuation of application No. 15/984,210, filed on May 18, 2018, now Pat. No. 10,853,178.

(51) Int. Cl.
  *G06F 9/455* (2018.01)
  *G06F 11/14* (2006.01)
  *G06F 9/48* (2006.01)
  *G06F 9/50* (2006.01)
  *G06N 20/00* (2019.01)
  *G06N 5/04* (2023.01)

(52) U.S. Cl.
  CPC .......... *G06F 11/1407* (2013.01); *G06F 9/455* (2013.01); *G06F 9/485* (2013.01); *G06F 9/5016* (2013.01); *G06F 2201/82* (2013.01); *G06N 5/04* (2013.01); *G06N 20/00* (2019.01)

(58) Field of Classification Search
  CPC .......... G06F 9/485; G06F 9/5016; G06F 9/455
  See application file for complete search history.

(56) References Cited

U.S. PATENT DOCUMENTS

| | | | |
|---|---|---|---|
| 6,154,877 A * | 11/2000 | Ramkumar | G06F 11/1438 717/114 |
| 9,870,290 B1 * | 1/2018 | Havemose | G06F 11/1407 |
| 2002/0062389 A1 * | 5/2002 | Vertes | G06F 9/54 712/208 |
| 2005/0050545 A1 * | 3/2005 | Moakley | G06F 9/45533 718/104 |
| 2007/0174697 A1 * | 7/2007 | Saridakis | G06F 11/1471 714/19 |

(Continued)

*Primary Examiner* — Dong U Kim
(74) *Attorney, Agent, or Firm* — Knobbe, Martens, Olson & Bear, LLP

(57) ABSTRACT

Technology is described for a checkpoint service for code function checkpoints associated with instances of code functions executed by a computing hub in a local area network. Subsequent to the execution of a code function being suspended by the computing hub, the computing hub may generate a code function checkpoint describing the execution of the code function. The computing hub may persist the code function checkpoint to storage using a checkpoint service. The computing hub may create the code function checkpoint in response to monitoring metrics associated with the computing hub, such as processor overutilization. The computing hub may resume the execution of the code function at a later time using the code function checkpoint retrieved from the checkpoint service.

20 Claims, 13 Drawing Sheets

(56) References Cited

U.S. PATENT DOCUMENTS

| | | | |
|---|---|---|---|
| 2010/0031084 A1* | 2/2010 | Tremblay | G06F 9/30043 714/13 |
| 2012/0005461 A1* | 1/2012 | Moir | G06F 9/3834 712/228 |
| 2012/0041747 A1* | 2/2012 | Aarts | G06F 30/20 703/14 |
| 2012/0066555 A1* | 3/2012 | Ganesh | G06F 11/0715 714/49 |
| 2012/0159462 A1* | 6/2012 | Leibman | G06F 11/3636 712/34 |
| 2015/0052313 A1* | 2/2015 | Ghai | G06F 12/0864 711/136 |
| 2015/0363277 A1* | 12/2015 | Cher | G06F 11/1438 714/19 |
| 2016/0139899 A1* | 5/2016 | Adl-Tabatabai | G06F 8/30 717/146 |
| 2016/0266947 A1* | 9/2016 | Gaur | G06F 11/302 |
| 2019/0196920 A1* | 6/2019 | Andrade Costa | G06F 11/1471 |

* cited by examiner

CODE FUNCTION CHECKPOINT AND RESTORE

PRIORITY DATA

This application is a continuation of U.S. patent application Ser. No. 15/984,210, now U.S. Pat. No. 10,853,178, which is incorporated herein by reference.

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability and reduce time to deploy new applications.

Advancements in communication technologies have allowed even relatively inexpensive electronic devices to communicate with other devices and computing systems over a computer network. For example, the Internet of Things (IoT) is the interconnection of computing devices scattered across the globe using the existing Internet infrastructure. Such devices may be able to capture data, and then the devices may securely communicate the data over a network to a centralized computing service in a service provider environment. In one example, the devices may send the data to a computing hub or computing node in a local wireless network, and the computing hub may forward the data received from the devices to the centralized service in the service provider environment.

Electronic devices (e.g., IoT devices or embedded devices) may be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. Electronic devices (e.g., IoT devices, etc.) may be useful for a number of applications, such as environmental monitoring, farming, infrastructure management, industrial applications, building and home automation, energy management, medical and healthcare systems, transport systems, etc.

DETAILED DESCRIPTION

Figure 1:
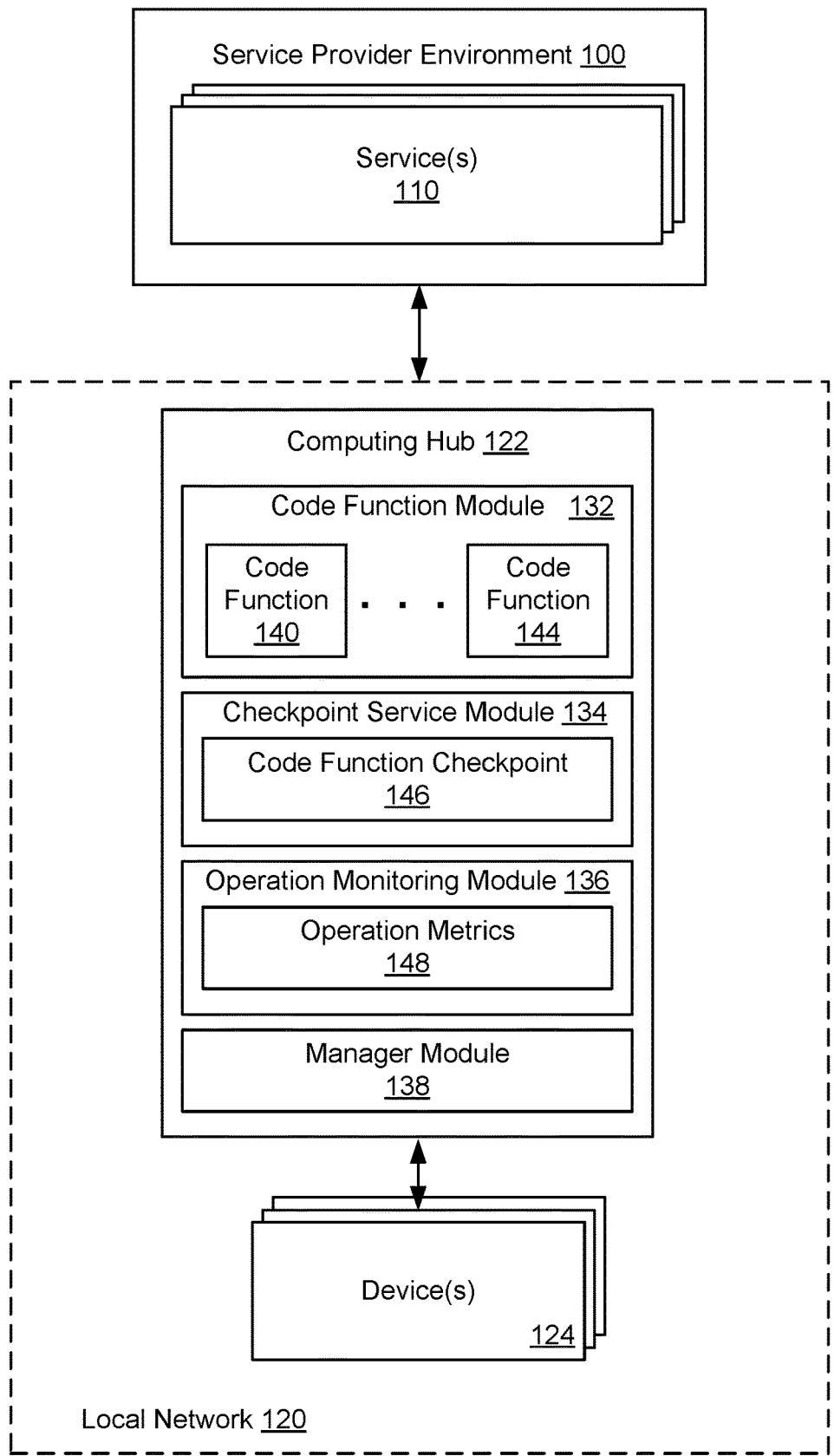
FIG. 1 illustrates a system and related operations that may implement a checkpoint service for code function checkpoints in a computing hub in a network according to an example of the present technology.

A technology is described for a checkpoint service for a computing hub. A computing hub may generate code function checkpoints associated with instances of code functions executed by the computing hub. The checkpoint service may determine when to checkpoint the instances of the code functions executed by the computing hub. For example, the checkpoint service may determine to suspend the execution of an instance of a code function in response to overutilization of one or more resources of the computing hub. The checkpoint service may generate a code function checkpoint for the instance of the code function and terminate the instance, for example, to alleviate the overutilization of the resources of the computing hub.

The checkpoint service may collect information about one or more resources of the computing hub that are utilized during the execution of the code functions. The checkpoint service may generate the code function checkpoints using the collected information. The checkpoint service may generate a set of files that represent an instance of a code function. The checkpoint service may store the code function checkpoints in local storage of the computing hub. The checkpoint service may enable, for example, the computing hub to retrieve a code function checkpoint associated with a previously terminated instance of a code function from the local storage. The execution resources of the computing hub (e.g., code function execution services) may be sent the code function checkpoint, and the computing hub may then resume the execution of the instance of the code function.

A group of computing hubs may be connected to one or more devices (e.g., IoT devices). The computing hubs may be logically assigned as the group to handle data generated by the devices. The computing hubs may invoke code functions to process the data. Some of the code functions may be short-lived, maintaining little to no state information during execution to process the data and terminating upon completion. Others of the code functions may be long-lived, maintaining state information during execution and continuously running to process the data.

One computing hub in a group may invoke a code function and execute an instance of the code function to process the data. While the computing hub executes the instance of the code function, the operation of the computing hub may experience a variety of changes, such as a change in processor utilization, a change in memory usage (i.e., memory pressure), a change in storage capacity, a software failure, a hardware failure, and the like. The computing hub may suspend the execution of the instance of the code function in response to an actual or anticipated change in operation. Accordingly, the computing hub may generate a code function checkpoint for the instance of the code function.

In one example of the present technology, the computing hub may persist the code function checkpoint associated with the instance of the code function using the checkpoint service. After persisting the code function checkpoint to a storage device using the checkpoint service, the computing hub may terminate the instance of the code function, for example, when an actual or anticipated change in operation satisfies one or more predetermined conditions (e.g., when a processor is overloaded). The computing hub may later retrieve the code function checkpoint from the checkpoint service and resume the execution of the instance of the code function, for example, when another change in the operation of the computing hub allows for the execution of the instance of code function.

In another example of the present technology, one computing hub in a group of computing hubs may expose a storage interface to the checkpoint service. The computing hub may use the distributed storage interface to persist code function checkpoints. In response to receiving the code function checkpoint via the storage interface, the checkpoint service may persist the code function checkpoint to a local storage device of the computing hub. The computing hub may retrieve the code function checkpoint from the checkpoint service in response to a request made via the storage interface. The checkpoint service may also retrieve the code function checkpoint from the local storage device and reply to the request using the code function checkpoint.

In response to receiving the code function checkpoint, the checkpoint service may persist the code function checkpoint to remote storage. The checkpoint service may send the code function checkpoint to a service provider environment or another computing hub. The checkpoint service may retrieve the code function checkpoint from the remote storage in response to a request made via the storage interface. The checkpoint service may reply to the requests using the retrieved code function checkpoint. The computing hub may resume the execution of the instance of the code function using the code function checkpoint retrieved from the checkpoint service.

In one example of the present technology, a manager may coordinate the scheduling of the execution of the code functions by the computing hub. The manager may determine when to execute the code functions. The manager may analyze information about the computing hub to determine the operational status of the computing. The manager may determine that the computing hub may experience an actual or predicted change in operation. As a result, the manager may instruct the computing hub to generate a code function checkpoint and store the code function checkpoint using the checkpoint service. The manager may later instruct the computing hub to resume execution of the code function.

In another example of the present technology, the checkpoint service may be utilized in a failure scenario for the computing hub. The computing hub may periodically generate code function checkpoints for an instance of a code function executing on the computing hub using a checkpoint schedule. The computing hub may persist the code function checkpoint using the checkpoint service. The checkpoint service may enable the computing hub to resume the execution of the instance of the code function in the event the computing hub experiences a failure.

FIG. 1—Checkpoint Service for Code Function Checkpoints

FIG. 1 illustrates a system and related operations that may implement a checkpoint service for code function checkpoints in a computing hub in a network according to an example of the present technology. The checkpoint service may provide for storage of code function checkpoints by the computing hub. For example, the computing hub may generate the code function checkpoints for instances of code functions executed by the computing hub. The computing hub may utilize the checkpoint service to store the code function checkpoints. The checkpoint service may provide storage of the code function checkpoints to a storage device of the same computing hub. The checkpoint service may storage the code function checkpoint to remote storage. The computing hub may retrieve the code function checkpoints using the checkpoint service. The computing hub may restore resume, or restart execution of the instances of corresponding code functions using the code function checkpoints retrieved from the checkpoint service.

According to an example of the present technology, the checkpoint service may enable a load-balancing service for the computing hub. For example, the computing hub may execute an instance of a code function. The computing hub may experience a change in operation, such as an increase in processor utilization, an increase memory utilization (i.e., memory pressure), memory thrashing, insufficient disk space, a software fault, a hardware failure, and the like. Accordingly, the computing hub may suspend the instance of the code function, generate a code function checkpoint, and store the code function checkpoint using the checkpoint service. The checkpoint service may store the code function checkpoint to local storage or remote storage. The computing hub may resume execution of the instance of the code function using the code function checkpoint retrieved from the checkpoint service. The load of execution of various code functions may be balanced by the computing hub using the checkpoint service.

In another example, the checkpoint service may enable a failure service for the computing hub. The computing hub may be responsible for executing an instance of a code function. The computing hub may periodically generate a code function checkpoint for the instance of the code function and store the code function checkpoint using the checkpoint service. The checkpoint service may store the code function checkpoint to local storage or remote storage. A failure in the computing hub may terminate the instance of the code function. The computing hub may resume execution of the instance of the code function using the code function checkpoint retrieved from the checkpoint service.

FIG. 1 illustrates example components of the present technology in communication with a service provider environment 100. The service provider environment 100 may include one or more computing systems providing one or more service(s) 110. Some examples of the service(s) 110 may include computing services, platform as a service, software as a service, storage as a service, on-demand applications, and services for the execution of code functions. As illustrated, the service provider environment 100 may be in communication with a local network 120. For example, the service provider environment 100 and the local network 120 may be connected by the Internet or a wide area network (WAN).

The local network 120 may provide communication between a computing hub 122 and one or more device(s) 124. The computing hub 122 may provide one or more services to the device(s) 124. For example, the computing hub 122 may provide communication services between the device(s) 124 and the service provider environment 100. The computing hub 122 may forward data generated by the device(s) 124 to the service(s) 110 for collection, aggregation, formatting, processing, storage, and the like. In another example, the computing hub 122 may provide local data processing services for the data generated by the device(s) 124.

The computing hub 122 may include one or more hardware and/or software elements for providing the services to the device(s) 124. The computing hub 122 may include, for example, processor-based systems. As illustrated in FIG. 1, the computing hub 122 may include a code function module 132, a checkpoint service module 134, an operation monitoring module 136, and a manager module 138.

The code function module 132 may include a first code function 140 and a second code function 144. The code function module 132 may include hardware and/or software elements for providing a code function execution service to enable execution of one or more code functions, such as the code functions 140, 144. The code functions 140, 144 may perform a variety of operations when executed by the computing hub 122. For example, the first code function 140 may perform operations on the data generated by the device(s) 124, such as transformations, aggregations, filtering, and the like. In another example, the second code function 144 may operate on the data generated by a first device 124 and return a result to the first device 124. Another code function may format the data generated by the device(s) 124 before forwarding the formatted data to the service(s) 110 of the service provider environment 100. The code functions 140, 144 may be portions of code that may be executed using the code function module 132. The code functions 140, 144 may be segments of program code that are capable of receiving parameters, processing the data, and returning values. The code functions 140, 144 may be written in a high level programming language, a scripting language, or a combination thereof. The code functions 140, 144 may be functions that may be instantiated in a container hosted by the computing hub 122.

The code function module 132 may invoke one or more instances of the code functions 140, 144, and the code function module 132 may terminate the execution of the instances of the code functions 140, 144 at completion. In another example, the instances of the code functions 140, 144 may be long-lived, continually awaiting new data for processing. The code function module 132 may subsequently suspend the execution of the instances of the code functions 140, 144 for a variety of reasons. For example, the code function module 132 may suspend the instances of the code functions 140, 144 according to a schedule. In another example, the code function module 132 may suspend the execution of the instance of the code functions 140, 144 based at least in part on a state of execution, such as when the instances of the code functions 140, 144 are idle during execution. In yet another example, the code function module 132 may suspend the execution of the instance of the code functions 140, 144 based at least in part on operation of the computing hub 122, such as when utilization of a hardware or software resource exceeds a predetermined threshold.

After suspending the execution of the instances of the code functions 140, 144, the code function module 132 may generate one or more code function checkpoints associated with the instances of the code functions 140, 144. The code function module 132 may generate the code function checkpoints using information that enables the computing hub 122 to resume execution of the instances of the code functions 140, 144. The code function module 132 may generate the code function checkpoint 146, for example, using processor state information (e.g., context and register data), memory state information (e.g., memory pages and scratch memory), data in other storage devices utilized by the code functions 140, 144, environment variables, command-line parameters, function arguments, metadata describing the operating system or application-specific information related to the code functions 140, 144, and the like. The code function module 132 (or one or more other elements of the computing hub 122) may store the code function checkpoint 146 using one or more local storage devices, network storage devices, network storage services, checkpoint services, cloud-based storage services, and the like.

The code function module 132 may utilize the checkpoint service module 134 to store the code function checkpoints. The checkpoint service module 134 may store a code function checkpoint 146. The checkpoint service module 134 may include hardware and/or software elements for storing and distributing one or more code function checkpoints.

The checkpoint service module 134 may expose a first storage interface for use by the computing hub 122 to store and retrieve the code function checkpoint 146 from one or more local storage devices. For example, the checkpoint service module 134 may store and retrieve the code function checkpoint 146 from persistent storage (e.g., disk or flash memory). In another example, the checkpoint service module 134 may expose a second storage interface for use by the computing hub 122 to store the code function checkpoints to remote storage. The checkpoint service module 134 may utilize an application programming interface (API) to provide the first interface for managing local storage of the code function checkpoint 146. The checkpoint service module 134 may further utilize the API to provide the second interface for managing remote storage of the code function checkpoint 146.

The API exposed by the checkpoint service module 134 may receive, from the code function module 132 (or another element of the computing hub 122), a request to store the code function checkpoint 142. The checkpoint service module 134 may receive the request to store the code function checkpoint 146 in response to a periodic checkpoint schedule, a snapshot schedule, a backup schedule, a change in the operation of the computing hub 122, such as processor utilization exceeding a predetermined threshold, memory thrashing, low storage space, or another computing hub having different capabilities, and the like. The checkpoint service module 134 may receive the request to store the code function checkpoint 146 from the computing hub 122 or another element of the computing hub 122. The checkpoint service module 134 may return a response to the store request, indicating whether the request was successful.

The API exposed by the checkpoint service module 134 may receive, from the code function module 132, a request to read the code function checkpoint 146. The checkpoint service module 134 may receive the request to read the code function checkpoint 146 in order for the code function module 132 to resume execution of the instance of the code functions 140, 144. For example, the computing hub 122 may resume the execution of the instances of the code functions 140, 144 using the code function checkpoint 146 when processor utilization has decreased, memory paging has fallen below a predetermined threshold, disk space has increased, a failure occurs in another computing hub, or another change in the operation of the computing hub 122 enables the instances of the code functions 140, 144 to resume. The checkpoint service module 134 may receive the request to read the code function checkpoint 146 from the computing hub 122 or another member of the computing hub group 122. The checkpoint service module 134 may return a response to the read request, indicating whether the read request was successful.

The API exposed by the checkpoint service module 134 may receive, from the code function module 132, a request to update the code function checkpoint 146. For example, the checkpoint service module 134 may receive the request to update the code function checkpoint 146 in response to instructions to perform periodic backup of the instances of the code functions 140, 144. The checkpoint service module 134 may receive the request to update the code function checkpoint 146 from the computing hub 122 or another element of the computing hub 122. The checkpoint service module 134 may return a response to the update request, indicating whether the update request was successful.

The API exposed by the checkpoint service module 134 may receive, from the code function module 132, a request to delete the code function checkpoint 146. For example, checkpoint service module 134 may receive the request to delete the code function checkpoint 146 when the execution of the instances of the code functions 140, 144 has successfully terminated. The checkpoint service module 134 may receive the request to delete the code function checkpoint 146 from the computing hub 122 or another element of the computing hub 122. The checkpoint service module 134 may return a response to the delete request, indicating whether the delete request was successful.

The API exposed by the checkpoint service module 134 may enable the automatic storage of the code function checkpoint 146 for the computing hub 122. The checkpoint service module 134 may provide that each code function checkpoint generated and stored by the computing hub 122 is locally or remotely stored for the computing hub 122. The checkpoint service module 134 may enable the computing hub 122 to resume the instances of the code functions 140, 144 previously invoked and terminated by the computing hub 122. As the computing hub 122 may have access to code function checkpoints generated by itself, the computing hub 122 may retrieve a code function checkpoint and resume execution of an instance of a corresponding code function.

Referring again to FIG. 1, the operation monitoring module 136 may collect information about the operation of the computing hub 122. The operation monitoring module 136 may include hardware and/or software elements that monitor one or more operations of one or more computing hubs. The operation monitoring module 136 may monitor the operations of the computing hub 122 by collecting one or more metrics related to a processor, a memory device, a storage device, an input/output device, a network interface, and the like. The operation monitoring module 136 may collect operation metrics 148. The operation monitoring module 136 may store the operation metrics 148 in a data store.

The operation monitoring module 136 may send the operation metrics 148 to one or more services for analysis. According to one example of the present technology, the manager module 138 may utilize the operation metrics 148 to make intelligent decisions regarding the operation of the computing hub 122. The manager module 138 may determine when the code function module 132 is to generate the code function checkpoint 146. In addition, the manager module 138 may determine how (e.g., where) the checkpoint service module 134 stores the code function checkpoint 146.

The manager module 138 may perform analyses using the operation metrics 148. The manager module 138 may determine the operational status of the computing hub 122. The manager module 138 may control one or more elements of the computing hub 122 based at least in part on the analyses. In one example, when the operation metrics 148 indicate that utilization of a processor of the computing hub 122 exceeds a predetermined threshold, the manager module 138 may instruct the computing hub 122 to suspend execution of an instance of the first code function 140 and generate the code function checkpoint 146. In another example, when the operation metrics 148 indicate that utilization of a processor of the computing hub 122 falls below the predetermined threshold, the manager module 138 may instruct the computing hub 122 to resume execution of the instance of the first code function 140 using the code function checkpoint 146.

According to one example of the present technology, the manager module 138 may determine from the operation metrics 148 that the computing hub 122 is under memory pressure (e.g., memory thrashing or memory usage exceeding a usage threshold) and no longer able to execute the first code function 140. The manager module 138 may instruct the checkpoint service module 134 to store the code function checkpoint 146 to local storage enabling the computing hub 122 to resume the execution of the first code function 140. The manager module 138 may instruct the code function module 132 to retrieve the code function checkpoint 146 from the checkpoint service module 134 and resume execution.

Figure 2:
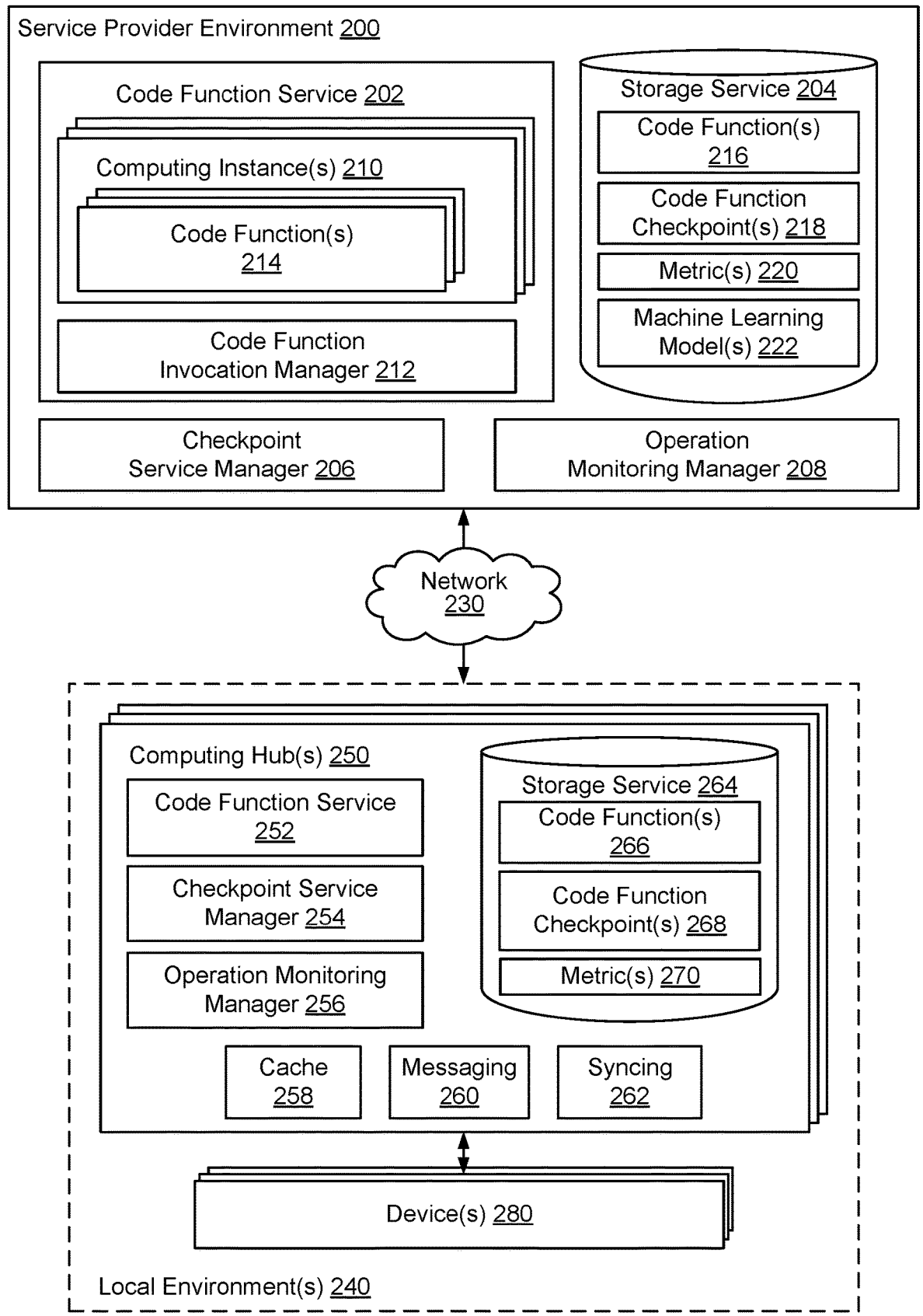
FIG. 2 is an illustration of a networked system utilizing a service provider environment that may implement a checkpoint service for code function checkpoints in a group of computing hubs in a network according to an example of the present technology.

FIG. 2—Management with Service Provider Environment

FIG. 2 is an illustration of a networked system utilizing a service provider environment 200 that may implement a checkpoint service for code function checkpoints in a group of computing hubs in a network according to an example of the present technology. One example of the service provider environment 200 includes a centralized service providing on-demand computing and storage resources. The service provider environment 200 may include one or more server computers hosting one or more services. In another example of the present technology, the code function checkpoint management and operational control of one or more computing hubs may be performed by the service provider environment 200.

As illustrated, the service provider environment 200 may include a code function service 202, a storage service 204, a checkpoint service manager 206, and an operation service manager 208. The code function service 202 may include one or more computing instance(s) 210 and a code function invocation manager 212. The computing instance(s) 210 may include one or more code function(s) 214. The storage service 204 may include one or more code function(s) 216, one or more code function checkpoint(s) 218, metric(s) 220, and one or more machine learning model(s) 222.

The service provider environment 200 may utilize a network 230 to communicate with one or more local environment(s) 240. The local environment(s) 240 may include one or more computing hub(s) 250 and one or more device(s) 280. The computing hub(s) 250 may include a code function service 252, a checkpoint service manager 254, an operation monitoring manager 256, a cache service 258, a messaging service 260, a syncing service 262, and a storage service 264. The storage service 264 may include one or more code function(s) 266, one or more code function checkpoint(s) 268, and one or more metric(s) 270.

The service provider environment 200 may utilize the code function service 202 to execute one or more code functions to process data, such as data generated by IoT devices. The code function service 202 may include one or more server computers or hosts configured to provide the execution of the code functions. The code function service 202 may utilize the one or more computing instance(s) 210 on the server computers or hosts to handle the processing of the data. The computing instance(s) 210 may include one or more containers, environments, virtual machines, or the like to execute the code function(s) 214.

The code function invocation manager 212 may utilize the computing instance(s) 210 to instantiate one or more of the code function(s) 214. For example, the code function invocation manager 212 may instantiate and monitor the execution of the code function(s) 214. The code function invocation manager 212 may determine when and where to invoke the code function(s) 214 using the computing instance(s) 210. The code function invocation manager 212 may invoke the code function(s) 214 in response to data events in storage service 204 or requests received via the network 230 from one or more local environment(s) 240. The code function invocation manager 212 may invoke the code function(s) 214 to perform a variety of operations on the data, such as transformations, aggregations, filtering, and the like. The code function invocation manager 212 may retrieve the code function(s) 216 from the storage service 204 when needed.

The code function invocation manager 212 may generate one or more code function checkpoints for instances of the code function(s) 214. The code function invocation manager 212 may cause the computing instance(s) 210 to suspend the execution of the instances of the code function(s) 214 and generate the code function checkpoints. The code function invocation manager 212 may store the code function checkpoint(s) 218 using the storage service 204. The code function invocation manager 212 may also retrieve the code function checkpoint(s) 218 from the storage service 204 and invoke the code function(s) 214 using the computing instance(s) 210 to resume execution of the instances of the code function(s) 214 associated with the code function checkpoint(s) 218.

The checkpoint service manager 206 may include one or more server computers providing management of one or more code functions and associated code function checkpoints. The checkpoint service manager 206 may determine how to distribute the code function checkpoint(s) 218 to one or more resources, such as to the code function service 202 or to the computing hub(s) 250 within the local environment(s) 240. The checkpoint service manager 206 may enable execution of the code functions 214, 216 to resume, either using the code function service 202 or within the local environment(s) 240, based at least in part on the code function checkpoint(s) 218. The checkpoint service manager 206 may further enable the execution of the code functions 214, 216 to resume using the code function service 202 in response to one or more code function checkpoints received from local environment(s) 240.

The operation service manager 208 may include one or more server computers providing operational management of the computing hub(s) 250 within the local environment(s) 240. The operation service manager 208 may collect operational information, such as the utilization of a processor, a memory, or a disk, from the computing hub(s) 250 and store the operational information using the storage service 204, for example, as the metric(s) 220. The operation service manager 208 may analyze the metric(s) 220 to determine the operation of the computing hub(s) 250. The operation service manager 208 may apply one or more of the machine learning model(s) 222 to determine the state of operation of the computing hub(s) 250. The operation service manager 208 may perform one or more operations with respect to the computing hub(s) 250 based at least in part on the state. Some examples of operations may include suspending execution of a code function, generating a code function checkpoint, and resuming execution of the code function using the code function checkpoint.

As discussed above, the checkpoint service manager 206 may distribute the code function checkpoint(s) 218 via the network 230 to the local environment(s) 240. The network 230 may include a communications network, such as the Internet, a metropolitan area network (MAN), a local area network (LAN), a wireless local area network (WAN), or another type of suitable network. Within the local environment(s) 240, the computing hub(s) 250 and the device(s) 280 communicate connect using any type of suitable network.

The computing hub(s) 250 may also be referred to as a computing node, execution hub, or a communication hub. The computing hub(s) 250 may utilize the code function service 252 to invoke instances of the code function(s) 266. In one example, upon receiving data at the computing hub(s) 250 from the device(s) 280, the computing hub(s) 250 may forward the data to the service provider environment 200 for processing by the code function service 202. In another example, the computing hub(s) 250 may utilize the code function service 252 to instantiate one or more code functions, such as the code function(s) 266, to locally process the data. Much like the code functions 214, 216 of the service provider environment 200, the code function(s) 266 may perform a variety of operations on the data, such as transformations, aggregations, filtering, and the like.

The computing hub(s) 250 may utilize the checkpoint service manager 254 to manage the code function(s) 266, the code function checkpoint(s) 268, or combinations thereof. The checkpoint service manager 254 may manage the storage, retrieval, and distribution of the code function(s) 266 and the code function checkpoint(s) 268. The checkpoint service manager 254 may store the code function(s) 266 using the storage service 264. The checkpoint service manager 254 may retrieve the code function(s) 266 using the storage service 264 in response to a request by the code function service 252, for example.

The checkpoint service manager 254 may also store the code function checkpoint(s) 268 to remote storage. The checkpoint service manager 254 may include information identifying one or more of the computing hub(s) 250 and/or the service provider environment 200 as remote storage locations. The checkpoint service manager 254 may store the code function checkpoint(s) 268 to the remote storage locations (e.g., in the storage service 204).

The operation monitoring manager 256 may manage operations and metric collections for one or more of the computing hub(s) 250. The operation monitoring manager 256 may collect operational information of the computing hub(s) 250, such as the utilization of a processor, a memory, or a disk. The operation monitoring manager 256 may also collect information about the execution of the code function(s) 266 instantiated by the code function service 252. The operation monitoring manager 256 may store the collected information as the metric(s) 270 in the storage service 264.

The operation monitoring manager 256 may utilize the metric(s) 270 to perform operations with respect to the computing hub(s) 250. Some examples of operations may include invoking an instance of a code function, suspending the instance of the code function, generating a code function checkpoint for the instances, and resuming the instance of the code function using the code function checkpoint.

In one example, a first operation monitoring manager 256 of a first computing hub 250 may cause a first code function service 252 to suspend execution of an instance of a first code function 266. The first operation monitoring manager 256 may cause the first code function service 252 (or another element of the first computing hub 250) to create a first code function checkpoint 268. The first code function checkpoint 268 may be generated in response to: a checkpoint schedule (e.g., a backup or snapshot schedule), the first instance being idle, a change in the operation of the first computing hub 250, or another computing hub having different capabilities. In another example, the first operation monitoring manager 256 of the first computing hub 250 may cause the first code function service 252 to resume execution of the instance of the first code function 266. The first operation monitoring manager 256 may resume the first code function 266 based at least in part on the first code function checkpoint 268 previously generated by the first computing hub 250. The first operation monitoring manager 256 may resume the first code function 266 in response to the metric(s) 270 indicating that the first computing hub 250 is able to execute an instance of the first code function 266.

Referring again to FIG. 2, in one configuration, the computing hub(s) 250 may utilize the cache service 258 for storing device reporting data or state data from the device(s) 280, for example, while the service provider environment 200 is inaccessible. When the service provider environment 200 becomes accessible again, the device data or state data may be uploaded from the cache service 258 to the service provider environment 200. In another example, the computing hub(s) 250 may utilize the messaging service 260 for providing messaging between the computing hub(s) 250 and the device(s) 280. In yet another example, the computing hub(s) 250 may utilize the syncing service 262 for synchronizing data and device states from the device(s) 280 to shadow device states in the service provider environment 200. More specifically, the computing hub(s) 250 may cache the state of the device(s) 280, using a virtual version, or "shadow," of the device(s) 280, which tracks the device's current versus a desired state. These localized shadow states may be synchronized with shadow states in the service provider environment 200.

The device(s) 280 may be, for example, processor-based systems or embedded systems. The device(s) 280 may include, but are not limited to, a desktop computer, laptop or notebook computer, tablet computer, handheld computer, workstation, network computer, or other devices with like capability. In another example, the device(s) 280 may include IoT devices. As non-limiting examples, the device(s) 280 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 230. Commercial devices may also be included in the definition of the device(s) 280, including: commercial printing presses, commercial freezers, commercial kilns, commercial mixers or other commercial equipment. The device(s) 280 may be other types of embedded devices that provide electronic controls for a machine or system.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "datastore" may refer to any device or combination of devices capable of storing, accessing, organizing and/or retrieving data, which may include any combination and number of data servers, relational databases, object-oriented databases, cluster storage systems, data storage devices, data warehouses, flat files and data storage configuration in any centralized, distributed, or clustered environment. The storage system components of the datastore may include storage systems such as a SAN (Storage Area Network), a virtualized storage network, volatile or non-volatile RAM, optical media, or hard-drive type media. The datastore may be representative of a plurality of datastores as can be appreciated.

The network 230 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
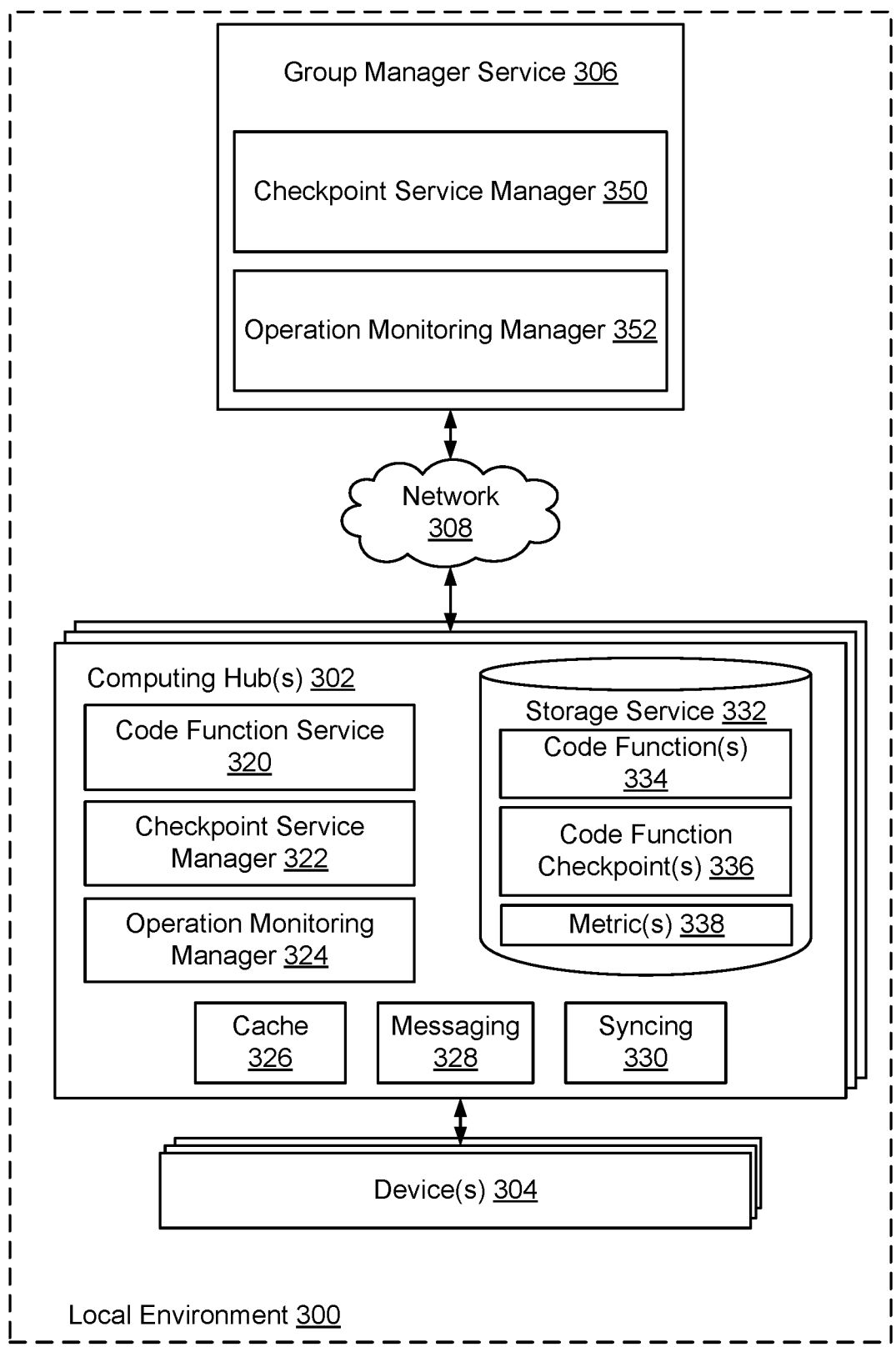
FIG. 3 is an illustration of a networked system within a local environment that may implement a checkpoint service for code function checkpoints in a group of computing hubs in a network according to an example of the present technology.

FIG. 3—Management within Local Environment

FIG. 3 is an illustration of a networked system within a local environment 300 that may implement a checkpoint service for code function checkpoints in a group of computing hubs in a network according to an example of the present technology. As illustrated, the local environment 300 may include one or more computing hub(s) 302, one or more device(s) 304, a group manager service 306, and a network 308. In this example of the present technology, the group manager service 306 may manage code function checkpoint distribution and operational management of the computing hub(s) 302 within the local environment 300.

The local environment 300 may utilize the network 308 to communicate between the computing hub(s) 302, the device(s) 304, and the group manager service 306. The computing hub(s) 302 may include a code function service 320, a checkpoint service manager 322, an operation monitoring manager 324, a cache service 326, a messaging service 328, a syncing service 330, and a storage service 332. The storage service 332 in the computing hub(s) 302 may include one or more code function(s) 334, one or more code function checkpoint(s) 336, and one or more metric(s) 338. The group manager service 306 may include a checkpoint service manager 350 and an operation monitoring manager 352.

The group manager service 306 may include one or more computers providing management of the code function checkpoint(s) 336. The group manager service 306 may utilize the checkpoint service manager 350 to determine how to distribute the code function checkpoint(s) 336 to the computing hub(s) 302 within the local environment 300. In one example, the checkpoint service manager 350 may receive and store a first code function checkpoint 336 from a first computing hub 302 and later send the first code function checkpoint 336 to the first computing hub 302. Alternatively, the code function checkpoint from one computing hub can be sent to another computing to resume execution.

The group manager service 306 may include one or more computers providing operational management of the computing hub(s) 302 within the local environment 300. The group manager service 306 may utilize the operation monitoring manager 352 to analyze the metric(s) 338 collected at the computing hub(s) 302. The operation monitoring manager 352 may analyze the metric(s) 338 to determine the operation of the computing hub(s) 302. The operation monitoring manager 352 may determine the state of operation of the computing hub(s) 302 and perform or trigger one or more operations for the code function(s) 334 with respect to the computing hub(s) 302 based at least in part on the state.

Figure 4:
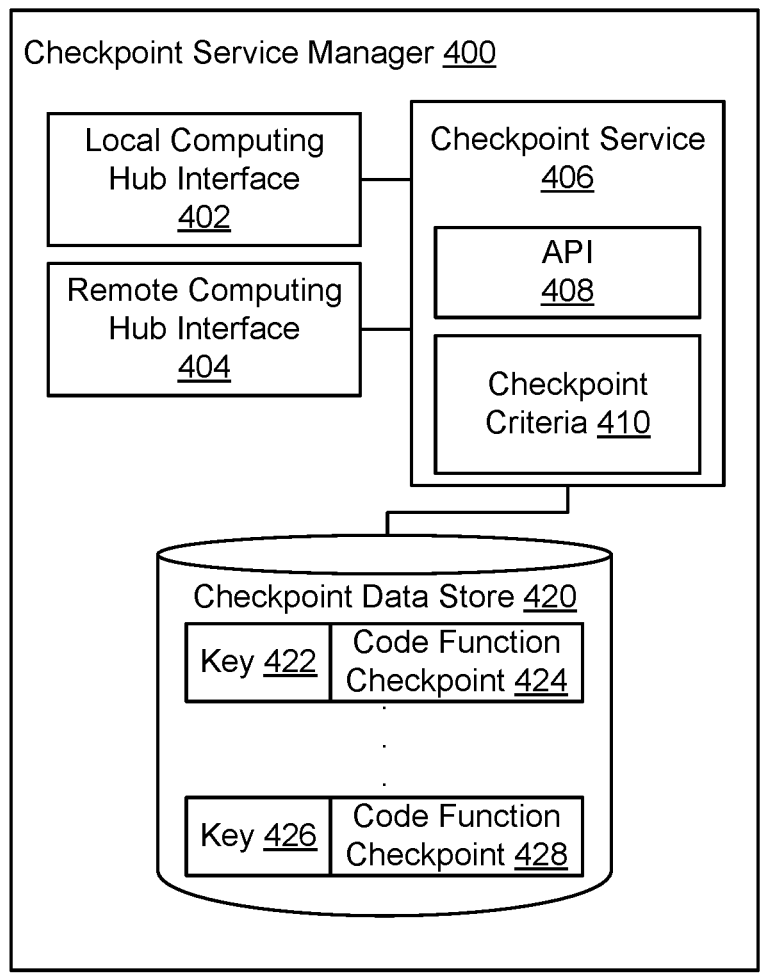
FIG. 4 is an illustration of a checkpoint service manager that may provide a checkpoint service for code function checkpoints according to an example of the present technology.

FIG. 4—Checkpoint Service Manager

FIG. 4 is an illustration of a checkpoint service manager 400 that may provide a checkpoint service for code function checkpoints according to an example of the present technology. The checkpoint service manager 400 enables a computing hub to participate in a checkpoint service. In another example, the checkpoint service manager 400 enables a service provider environment or another device to manage a checkpoint service for the computing hub. The checkpoint service manager 400 may persist code function checkpoints to one or more storage devices of the computing hub. The checkpoint service manager 400 may also distribute the code function checkpoints to remote storage.

In this example, the checkpoint service manager 400 includes a local computing hub interface 402 and a remote computing hub interface 404 in communication with a checkpoint service 406. The computing hub interfaces 402, 404 may include hardware and/or software elements configured to provide communication with the checkpoint service 406. Some examples of the computing hub interfaces 402, 404 may include inter-process communication, shared memory, a messaging bus, network interfaces, and the like. The checkpoint service 406 may include an application programming interface (API) 408 and checkpoint criteria 410. The checkpoint service manager 400 may also include a checkpoint data store 420 in communication with the checkpoint service 406. The checkpoint data store 420 may include a first key 422 corresponding to a first code function checkpoint 424 and a second key 426 corresponding to a second code function checkpoint 428.

The checkpoint service 406 may utilize the API 408 and the checkpoint criteria 410 to store and retrieve the code function checkpoints 424, 428 for a computing hub. The checkpoint service 406 may store and retrieve the code function checkpoints 424, 428 using local storage devices of a computing hub via the local computing hub interface 402. The checkpoint service 406 may alternatively store and retrieve the code function checkpoints 424, 428 using remote storage via the remote computing hub interface 404. The computing hub can then restore, resume, or restart the execution of the instance of the code function corresponding to the code function checkpoints 424, 428 from the moment the instance of the code function was checkpointed by the computing hub.

The API 408 of the checkpoint service 406 may receive, via one of the computing hub interfaces 402, 404, a request to create or store the first code function checkpoint 424. In response to the request, the checkpoint service 406 may cause the first code function checkpoint 424 to be stored in the checkpoint data store 420 using the first key 422. The request to store the first code function checkpoint 424 may include an image of the first code function checkpoint 424. In another example, the request may include information associated with the first code function checkpoint 424, such as information associated with the computing hub that generated the first code function checkpoint 424. Upon successfully completing the request, the checkpoint service 406 may send a response to the requestor, via one of the computing hub interfaces 402, 404, confirming storage of the first code function checkpoint 424. The response may include an acknowledgement that the code function checkpoint was stored. In another example, the response may include information identifying where the first code function checkpoint 424 was stored, such as to the checkpoint data store 420, another a local storage device, or the one or more computing hubs to which the first code function checkpoint 424 was distributed.

The API 408 of the checkpoint service 406 may receive, via one of the computing hub interfaces 402, 404, a request to read or retrieve the first code function checkpoint 424. In response to the request, the checkpoint service 406 may cause the first code function checkpoint 424 to be retrieved from the checkpoint data store 420 using the key 422. The request may include information identifying the first code function checkpoint 424. In another example, the request may include information associated with the first code function checkpoint 424, such as the code function associated with the first code function checkpoint 424, information identifying the instance invoking the code function from which the first code function checkpoint 424 was generated, or the like. Upon successfully completing the request, the checkpoint service 406 may send a response to the requestor, via one of the computing hub interfaces 402, 404. The response may include the first code function checkpoint 424, information identifying from where the first code function checkpoint 424 may be retrieved, information associated with the first code function checkpoint 424, and the like.

The API 408 of the checkpoint service 406 may receive, via one of the computing hub interfaces 402, 404, a request to update or modify the first code function checkpoint 424. In response to the request, the checkpoint service 406 may cause the first code function checkpoint 424 to be updated in the checkpoint data store 420. The request may include the first code function checkpoint 424 causing the checkpoint data store 420 to remove and replace the checkpoint from storage. The request may include a portion of the first code function checkpoint 424 causing the checkpoint data store 420 to remove and replace a corresponding portion of the checkpoint in storage. Upon successfully completing the request, the checkpoint service 406 may send a response to the requestor, via one of the computing hub interfaces 402, 404, confirming update of the first code function checkpoint 424.

The API 408 of the checkpoint service 406 may receive, via one of the computing hub interfaces 402, 404, a request to delete the first code function checkpoint 424. In response to the request, the checkpoint service 406 may cause the first code function checkpoint 424 to be deleted from the checkpoint data store 420. The request may include information identifying the first code function checkpoint 424. In another example, the request may include information associated with the first code function checkpoint 424, such as the code function associated with the first code function checkpoint 424, information identifying the instance invoking the code function from which the first code function checkpoint 424 was generated, or the like. Upon successfully completing the request, the checkpoint service 406 may send a response to the requestor, via one of the computing hub interfaces 402, 404, confirming deletion of the first code function checkpoint 424.

The checkpoint criteria 410 may include one or more checkpoint criterion each defining a checkpoint rule. The checkpoint rule may specify a condition that once satisfied by a code function checkpoint triggers an action. The condition may identify the code function checkpoint to which the rule applies and an evaluator to apply to the code function checkpoint. The action may specify one or more acts to take when the condition is met. The acts may include where and when to distribute the code function checkpoint. The acts further may set variables that may be evaluated to determine whether conditions that are more complex have been satisfied.

In another example, the checkpoint criteria 410 may identify the local or remote locations that are designated as storage destinations of the code function checkpoint. The checkpoint criteria 410 may include logic for modifying storage locations, for example, to add an identifier associated with a storage location to a list of storage locations or remove the identified storage location from the list. In another example, the checkpoint criteria 410 may identify which storage locations have access to particular code function checkpoints. The checkpoint criteria 410 may include logic for modifying which code function checkpoints are stored by particular storage locations, for example, to add a mapping indicating that a code function checkpoint is to be stored to a given storage location or remove the mapping between the code function checkpoint and the storage location. The checkpoint criteria 410 may further include logic for prioritizing which storage locations should receive a code function checkpoint before other storage locations.

The checkpoint criteria 410 may include one or more checkpoint storage rules that determine a storage location of a code function checkpoint. A checkpoint storage rule may identify one or more storage locations as destinations, for example, using information associated with a computing hub executing a code function, information associated with a code function, information associated with a code function checkpoint, information associated with a storage location, and the like. The checkpoint criteria 410 may include one or more machine learning models that determine a storage location of a code function checkpoint. A machine learning model for adaptive code function checkpoint storage may identify one or more storage locations as destinations, for example, using information associated with a computing hub executing a code function, information associated with a code function, information associated with a code function checkpoint, information associated with a storage location, and the like. A machine learning model may be trained using, for example, statistical and historical information about the storage locations used by the computing hub. The machine learning model may identify patterns and make predictions indicating a storage destination for a code function or type of code function.

The checkpoint data store 420 may include hardware and/or software elements storage for one or more code function checkpoints. As illustrated, the checkpoint database may include the first key 422 corresponding to the first code function checkpoint 424 and the second key 426 corresponding to the second code function checkpoint 428. The checkpoint data store 420 may generate keys internally according to one or more predetermined schemes. For example, the checkpoint data store 420 may generate random keys, incremental keys, unique keys, and the like. In one example, the checkpoint data store 420 may generate the keys 422, 426 based at least in part on information associated with the code function or the instance of the code function from which the code function checkpoints 424, 428 were generated. In other examples, the checkpoint data store 420 may store the code function checkpoints using: a relational database, unstructured data, binary blobs, files, and the like.

Figure 5:
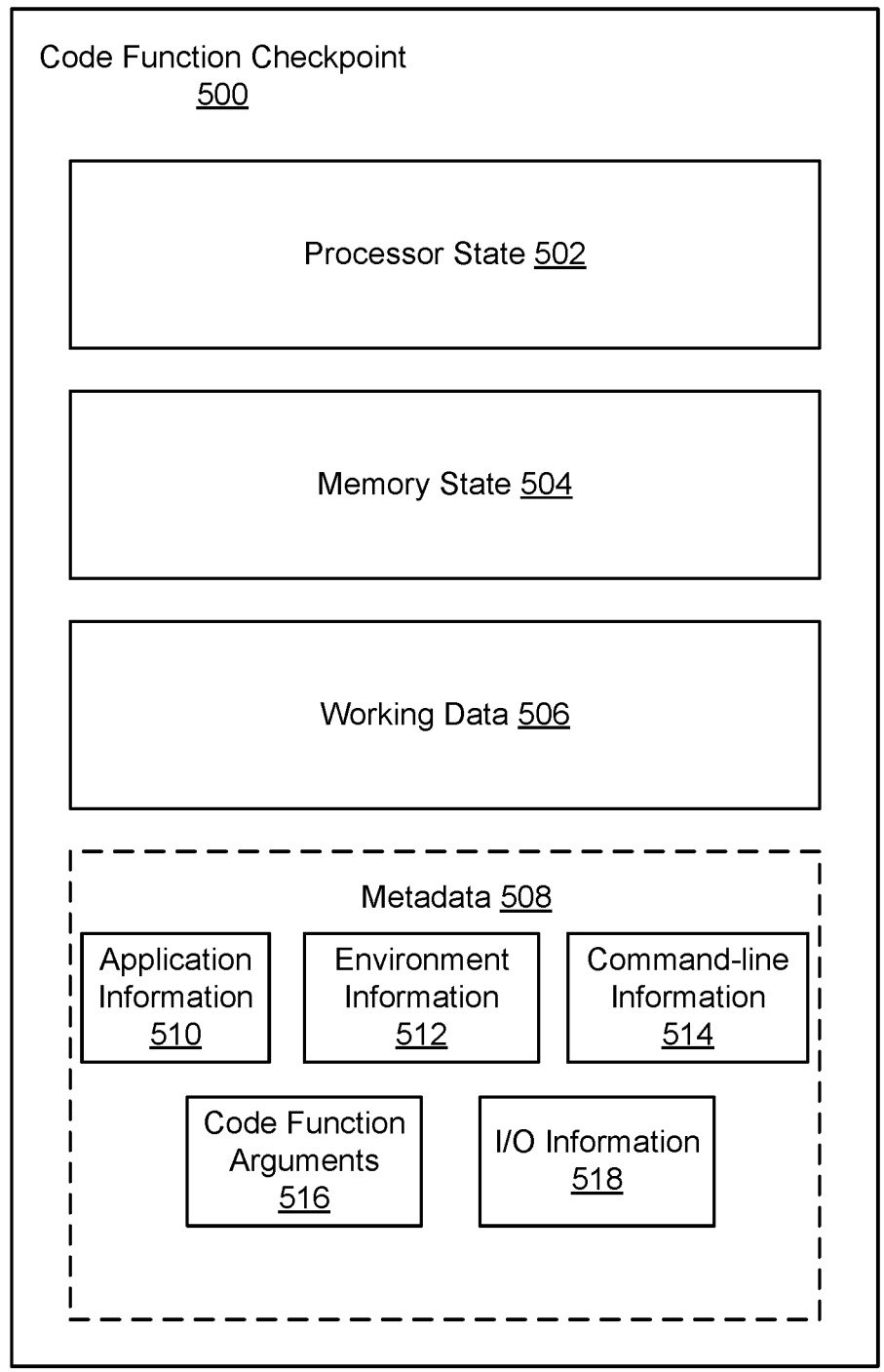
FIG. 5 is an illustration of a code function checkpoint that may be managed by the checkpoint service manager of FIG. 4 according to an example of the present technology.

FIG. 5—Code Function Checkpoint

FIG. 5 is an illustration of a code function checkpoint 500 that may be managed by the checkpoint service manager 400 of FIG. 4 according to an example of the present technology. The code function checkpoint 500 may include information to restore or resume execution of an instance of a code function to the computing hub (or another computing hub). The code function checkpoint 500 may further include information maintained by one or more operating system components or applications that facilitate the execution and management of code functions, such as log files, execution statistics, and the like.

As illustrated in FIG. 5, the code function checkpoint 500 may include a processor state 502, a memory state 504, working data 506, and optional metadata 508. The metadata 508 may include application information 510, environment information 512, command-line information 514, code function arguments 516, and I/O information 518. The code function checkpoint 500 may include one or more files or data chunks representing the processor state 502, the memory state 504, the working data 506, and the optional metadata 508. All or part of the files associated with the function checkpoint 500 may be compressed, encrypted, encoded, or formed from a combination thereof.

The processor state 502 may include information related to one or more processors associated with a computing hub involved in the execution of an instance of a code function. The processor state 502 may include a processor's context involved in the execution of the instance of the code function. The processor state 502 may include, for example, a copy of the processor register values forming a processor context, including the instruction pointer for the code function. The processor state 502 may be captured into a file describing the processor context.

The memory state 504 may include information related to one or more memory devices associated with the computing hub involved in the execution of the instance of the code function. The memory state 504 may include, for example, physical memory pages allocated to or otherwise used by the instance of the code function. In another example, the memory state 504 may include scratch memory used by a process in volatile memory. The memory state 504 may be captured into one or more memory dump files.

The working data 506 may include information related to one or more storage devices associated with the computing hub involved in the execution of the instance of the code function. The working data 506 may include data stored by the instance of the code function to non-volatile memory devices, such as flash storage or hard drives. The working data 506 may include temporary data, working data, and processed results.

Additional metadata related to the instance of the code function may also be captured and included in the code function checkpoint 500 as metadata 508. Metadata 508 may include information associated with one or more operating systems, applications, environments, containers, virtual machines, emulators, and the like, associated with the execution of the code function. For example, the application information 510 may include information maintained by an operating system and/or one or more applications about the instance of the code function. For example, a user application may monitor the execution of instances of code functions on a computing hub. Some examples of information associated with the user application may include a number of current code functions executing, a total number of available slots to executed code functions, identifiers, identifier to process identifier mappings, and the like.

The environment information 512 may include information about the environment within which the instances of the code functions execute. The environment information 512 may include environment variables, path variables, profile information for the user executing an instance of a code function, and the location of data files associated with the instance. The command-line information 514 may include information about the one or more commands used to instantiate the instances of the code functions. The command-line information 514 may identify the command, command line flags, and any command line parameters used during invocation.

The code function arguments 516 may include information about arguments passed to the instances of the code functions. The code function arguments 516 may include the actual arguments or references to locations where the argument values may be retrieved. The I/O information 518 may include information about input/output devices utilized by the instances of the code functions. The I/O information 518 may include network connection information, peripheral information, user interface information, and the like.

According to the present technology, the location at which a code function executes may migrate between computing hubs in a group. As each computing hub participates in the distributed checkpoint service, the code function checkpoint 500 may be replicated to at least one or more additional members of the group. Any computing hub in the group having the code function checkpoint 500 may resume the execution of the corresponding code function irrespective of when and where the code function was first instantiated or subsequently suspended. How the migration of the execution of the code function by any of the computing hubs occurs may use little to no input from a user.

Figure 6:
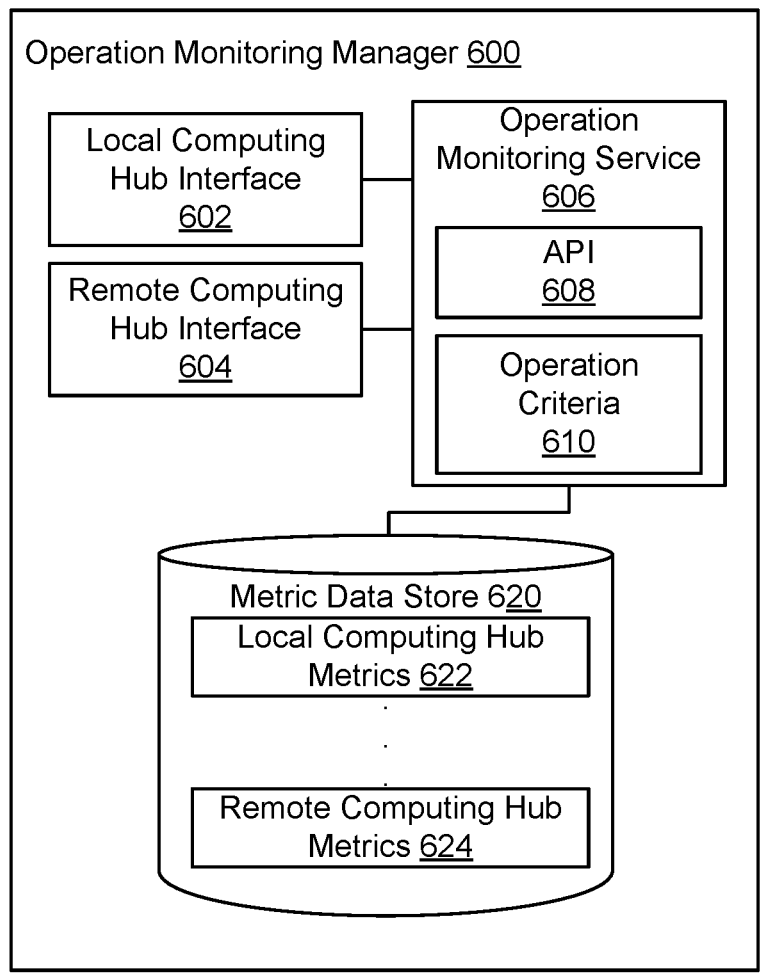
FIG. 6 is an illustration of an operation monitoring service manager that may be used in conjunction with the checkpoint service manager of FIG. 4 according to an example of the present technology.

FIG. 6—Operation Monitoring Manager

FIG. 6 is an illustration of an operation monitoring manager 600 that may be used in conjunction with the checkpoint service manager 400 of FIG. 4 according to an example of the present technology. In this example, the operation monitoring manager 600 may include a local computing hub interface 602 and a remote computing hub interface 604 in communication with an operation monitoring service 606. The computing hub interfaces 602, 604 may include hardware and/or software elements configured to provide communication with the operation monitoring service 606. Some examples of the computing hub interfaces 602, 604 may include inter-process communication, shared memory, a messaging bus, network interfaces, and the like. The operation monitoring manager 600 may also include a metric data store 620 in communication with the operation monitoring service 606. The operation monitoring service 606 may include an application programming interface (API) 608 and operation criteria 610. The metric data store 620 may include one or more local and remote computing hub metrics, such as local computing hub metrics 622 and remote computing hub metrics 624.

The API 608 of the operation monitoring service 606 may receive, via one of the computing hub interfaces 602, 604, a request to track and/or write the computing hub metrics 622, 624. The operation monitoring service 606 may cause the computing hub metrics 622, 624 to be stored in a metric data store 620. The request may include the computing hub metrics 622, 624, information associated with the requestor, or a combination thereof. Upon successfully completing the request, the operation monitoring service 606 may send a response to the requestor, via one of the computing hub interfaces 602, 604, confirming storage of the computing hub metrics 622, 624.

The API 608 of the operation monitoring service 606 may receive, via one of the computing hub interfaces 602, 604, a request to read or retrieve the computing hub metrics 622, 624. The operation monitoring service 606 may cause the computing hub metrics 622, 624 to be retrieved from the metric data store 620. Upon successfully completing the request, the operation monitoring service 606 may send the computing hub metrics 622, 624 to the requestor, via one of the computing hub interfaces 602, 604.

According to one example of the present technology, the operation monitoring service 606 may utilize the operation criteria 610 to determine when to instantiate, checkpoint, and resume instances of code functions by a computing hub. The operation criteria 610 may include one or more criterion each defining a rule. The rule may specify a condition that once satisfied by the metrics triggers an action. The condition may identify the metrics to which the rule applies and an evaluator to apply to the metrics. For example, the condition may compare the metrics associated with a resource of a computing hub against a usage threshold, an identified state of execution of an instance of a code function, a timing parameter associated with the execution, and the like. The action may specify one or more acts to take when the condition is met. The acts may include suspending the execution of an instance of the code function. The acts further may set variables that may be evaluated to determine whether operational conditions that are more complex have been satisfied.

The operation criteria 610 may specify one or more criterion related to operation of a computing hub, execution of a code function, a schedule associated with operation of a computing hub, a schedule associated with execution of a code function, a snapshot schedule defining when to periodically backup an instance of a code function, and the like.

The operation criteria 610 may specify when to checkpoint a code function due to operation of a computing hub executing the code function. In another example, the operation criteria 610 may specify when to checkpoint a code function due to the capabilities or capacity of a computing hub.

The operation criteria 610 may specify thresholds limiting utilization of one or more resources of a computing hub, such as a limit on processor usage or memory allocation. In another example, the operation criteria 610 may specify one or more states of execution of a code function, such as an active state or an idle state. In yet another example, the operation criteria 610 may specifying a minimum or maximum time parameter related to the operation of a computing hub or the execution of a code function. In a further example, the operation criteria 610 may specifying the capabilities, capacity, or resources of a computing hub.

The operation criteria 610 may include one or more operation rules that determine when to instantiate, checkpoint, and resume a code function using the computing hub metrics 622, 624. An operation rule may identify when to instantiate, checkpoint, and resume a code function, for example, using information associated with a computing hub executing a code function, information associated with a code function, information associated with a code function checkpoint, information associated with a storage device, and the like.

The operation criteria 610 may include one or more machine learning models that determine when to instantiate, checkpoint, and resume a code function using the computing hub metrics 622, 624. A machine learning model for adaptive checkpoint and restore may make predictions when to instantiate, checkpoint, and restore a code function, for example, using the computing hub metrics 622, 624. The machine learning model for adaptive checkpoint and restore may evaluate information associated with a computing hub executing a code function, information associated with a code function, information associated with a code function checkpoint, information associated with a storage device, and the like. A machine learning model may be trained using, for example, statistical and historical information about the operation of a computing hub. The machine learning model may identify patterns indicating when to instantiate, checkpoint, and resume a code function.

Figure 7:
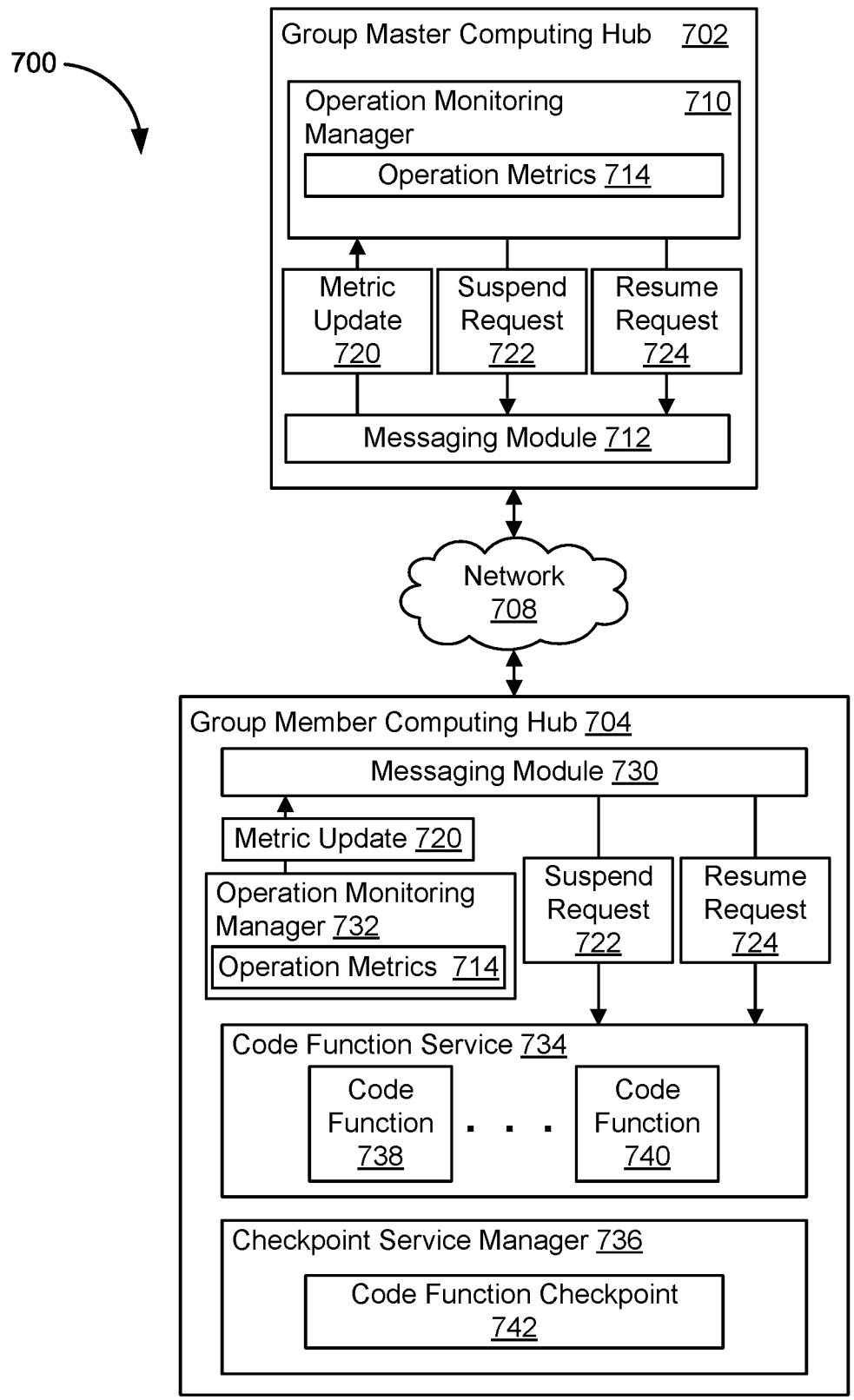
FIG. 7 illustrates a computing hub group management system and related operations for code function checkpoints in a network according to an example of the present technology.

FIG. 7—Computing Hub Group Management System

According to one example of the present technology, a computing hub that includes the operation monitoring manager may be elected as the master of a group of computing hubs. Each member of the group may communicate metrics to the operation monitoring manager of the master computing hub. The master computing hub can utilize the operation monitoring manager to analyze the metrics of each member of the group to determine when to instantiate, checkpoint, and resume code functions by the respective group member computing hubs. The master computing hub may decide when a member of the group can instantiate, checkpoint, and resume a code function. The master computing hub may cause one computing hub under memory pressure, for example, to checkpoint an instance of a code function.

FIG. 7 illustrates a computing hub group management system 700 and related operations for code function checkpoints in a network according to an example of the present technology. In this example, the computing hub group management system 700 may include a group master computing hub 702, a group member computing hub 704, and network 708. The group master computing hub 702 and the group member computing hub 704 may all be in communication via the network 708. The group master computing hub 702 may include hardware and/or software elements that coordinate operations of the group member computing hub 704. The group master computing hub 702 may be specifically designated as the master of a group. The group master computing hub 702 may further be elected by the group member computing hub 704 as the group master.

The group master computing hub 702 may include an operation monitoring manager 710 and a messaging module 712. The operation monitoring manager 710 may include operation metrics 714 corresponding to the group member computing hub 704. The operation monitoring manager 710 may receive a metric update 720 via the messaging module 712 to create or update the operation metrics 714. The operation monitoring manager 710 may send a suspend request 722 via the messaging module 712 to the group member computing hub 704. The operation monitoring manager 710 may further send a resume request 724 via the messaging module 712 to the group member computing hub 704. The group master computing hub 702 may utilize the operation monitoring manager 710 to analyze the operation metrics 714 to determine to when to send the suspend request 722 and the resume request 724

The group member computing hub 704 may include a messaging module 730, an operation monitoring manager 732, a code function service 734, and a checkpoint service manager 736. The messaging module 730 may coordinate communications with the group master computing hub 702 and the group member computing hub 704. The operation monitoring manager 732 may collect the operation metrics 714 about the group member computing hub 704. The group member computing hub 704 may individually analyze the collected metrics to determine whether execution of an instance of a code function needs to be suspended and resumed at a later time. The operation monitoring manager 732 may further send the operation metrics 714 for analysis to the group master computing hub 702 as the metric update 720 via the messaging module 730.

The group member computing hub 704 may execute instances of a first code function 738 and a second code function 740 using the code function service 734. During execution of the instance of the code functions 738, 740, the group member computing hub 704 may receive the suspend request 722 via the messaging module 730. In response to the suspend request 722, the group member computing hub 704 may instruct the code function service 734 to generate a code function checkpoint 742 based at least in part on the instance of the first code function 738. The code function service 734 may send the code function checkpoint 742 to the checkpoint service manager 736 for storage. The code function service 734 may optionally send the first code function 738 to the checkpoint service manager 736 for storage together with or separately from the code function checkpoint 742.

The checkpoint service manager 736 may receive the code function checkpoint 742 (and optionally the first code function 738) from the code function service 734. The checkpoint service manager 736 may store the code function checkpoint 742 to disk or memory. In another configuration, the checkpoint service manager 736 may further distribute the code function checkpoint 742 to the group member computing hub 704 for remote storage.

Prior to resuming an instance of the first code function 738, the group member computing hub 704 may receive the resume request 724 via the messaging module 730. In response to the resume request 724, the group member computing hub 704 may instruct the code function service 734 to retrieve the code function checkpoint 742 corresponding to the first code function 738 from the checkpoint service manager 736. The code function service 734 may optionally request the first code function 738 from the checkpoint service manager 736. Upon retrieval of the code function checkpoint 742 from the checkpoint service manager 736, the code function service 734 may resume execution of the instance of the first code function 738. The checkpoint service manager 736 may retrieve the code function checkpoint 742 (and optionally the first code function 738) from local storage, such as from a disk. The checkpoint service manager 736 may further retrieve the code function checkpoint 742 from remote storage, such as from the group member computing hub 704.

Figure 8:
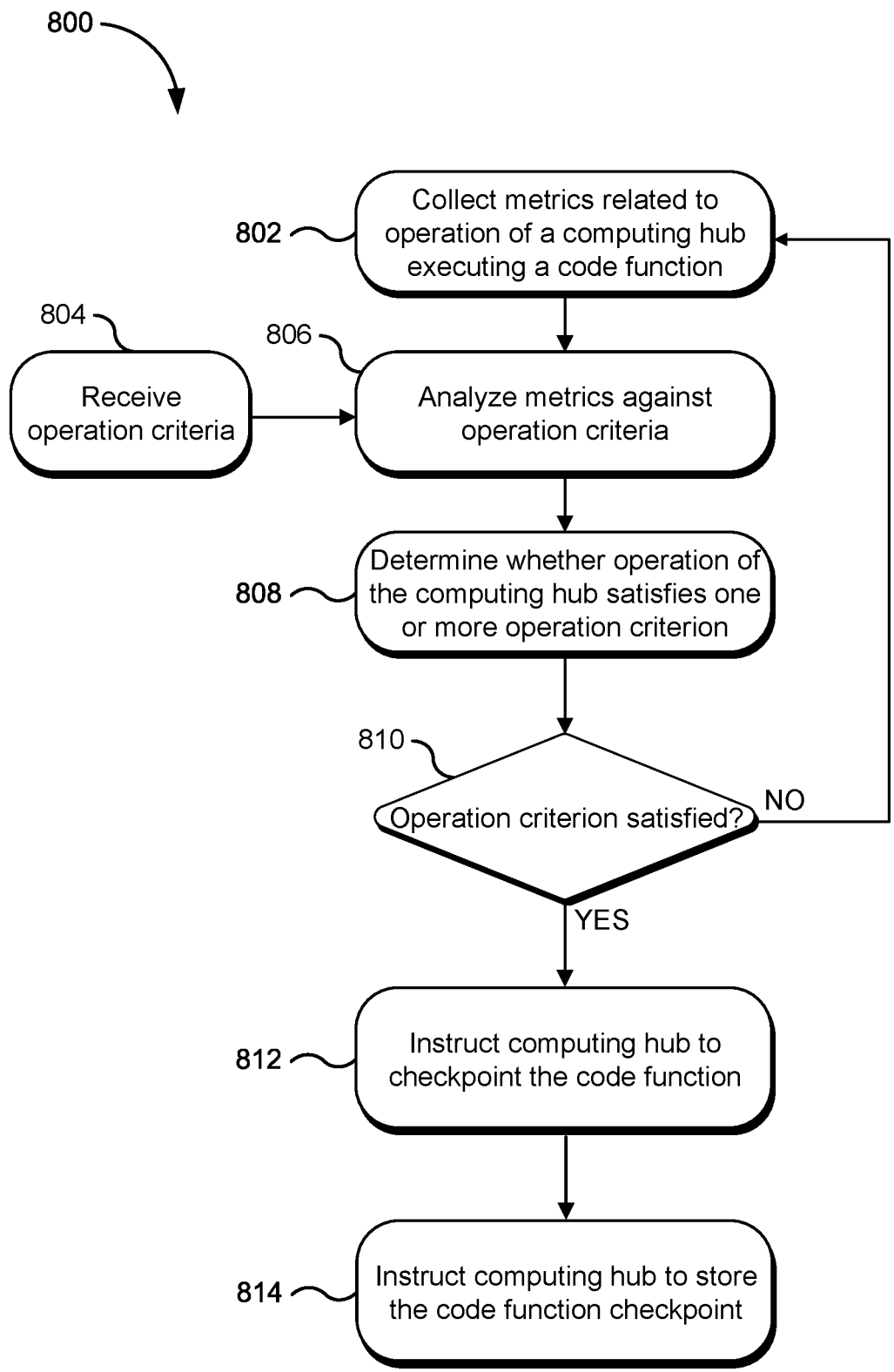
FIG. 8 is a flowchart of a method for generation of a code function checkpoint by a computing hub according to an example of the present technology.

FIG. 8—Code Function Checkpoint Generation and Storage

FIG. 8 is a flowchart of a method 800 for generation of a code function checkpoint by a computing hub according to an example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 800 enables the execution of a corresponding code function to be intelligently suspended and checkpointed considering the operation of the computing hub.

In operation 802, a device collects one or more metrics related to operation of a computing hub. For example, the device may periodically receive metrics from the computing hub. In another example, the computing hub may periodically forward the metrics to device. The device may include another computing hub in a computing hub group that includes the computing hub. The device may communicate directly with the computing hub. In another example, the device and the computing hub may communicate with an operation monitoring service accessible via a local area work or the Internet to exchange the metrics.

In operation 804, the device receives operation criteria. The device may obtain the operation criteria as defined by a specification. The specification may be obtained from a user or administrator, a library of operation criteria, a collection of operation criteria obtained from a service provider environment, and the like. In operation 806, the device analyzes the metrics against the operation criteria. For example, the device may apply one or more rules specified by the operation criteria to the metrics. The device may apply individual rules or a combination of rules to the metrics. The device may execute a state machine that defines the set of rules and transitions for analyzing the metrics.

In operation 808, the device determines whether the operation of the computing hub satisfies one or more of the operation criterion. The device may determine that usage of a resource of the computing hubs, such as a processor or memory device, exceeds a predetermined threshold defined by the operation criteria. The device may determine that a state of execution of the instance of the code function, such as an idle state, matches the state defined by the operation criteria. The device may determine that a time of operation, such as an execution time or the current time, satisfies a schedule defined by the operation criteria. In operation 810, if a determination is made in operation 808 that the operation criterion has not been satisfied, the processing of the method 800 continues in operation 802 by continuing to collect the metrics related to the operation of the computing hub.

If a determining is made in operation 808 that the operation criterion has been satisfied, the processing of the method 800 continues from operation 810 to operation 812. In operation 812, the device instructs the computing hub to checkpoint the code function. The device may instruct the computing hub via inter-process communication, via a messaging bus, via a local area network, via the Internet, and the like. The device may instruct the computing hub using a suspend request to checkpoint the code function when the operation of the computing hub is indicative of memory pressure or processor overload, when the execution of the code function is idle, or periodically to provide a backup in the case of a failure in the computing hub.

In operation 814, the device instructs the computing hub to store the code function checkpoint. The code function checkpoint may be stored suing a checkpoint service. The computing hub may resume the execution of the corresponding code function by retrieving the code function checkpoint from the checkpoint service when the computing hub experiences a change in operation that allows for execution of the code function to resume.

Figure 9:
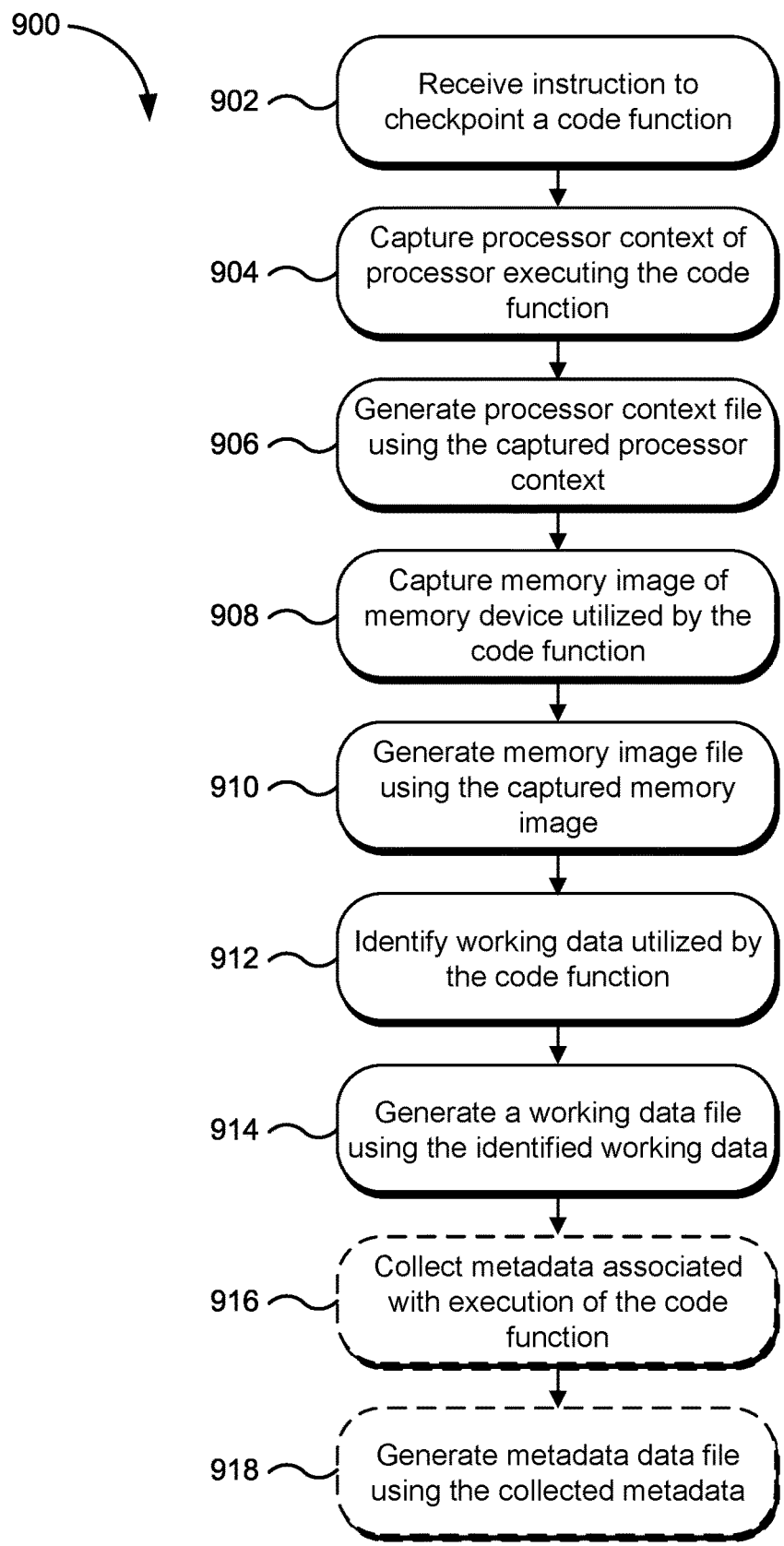
FIG. 9 is a flowchart of a method for constructing a code function checkpoint by a computing hub according to an example of the present technology.

FIG. 9—Method for Creating a Code Function Checkpoint

FIG. 9 is a flowchart of a method 900 for constructing a code function checkpoint by a computing hub according to an example of the present technology. The method 900 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 902, a device hub receives an instruction to checkpoint a code function. The instruction may identify a computing hub executing an instance of the code function, the code function itself, metadata about the execution of the code function, and the like. The instruction may be received from a manager of a computing hub, from a manager hosted by a service provider environment, or a manager within the same local environment as the computing hub.

In operation 904, the device may capture a processor context of one or more processors involved in the execution of an instance of the code function. The captured processor context may include a specification defining registers that a process may be using, the program counter, plus any other operating system specific data. The processor context may include a data structure, such as a process control block (PCB) or switchframe. In operation 906, the device generates a processor context file using the captured processor context. The device may generate one processor context file for each processor utilized during the execution of the instance of the code function. In another example, the device may combine information into a single file.

In operation 908, the device captures a memory image of one or more memory devices utilized by the code function. The memory image may include memory pages used by the instance of the code function. The memory image may include memory pages from shared memory mappings. The memory image may include memory pages from private memory mappings. The memory image may include scratch memory or temporary memory. The memory image may include or be accompanied by virtual memory information, such as the corresponding virtual memory addresses associated with captured memory pages. In operation 910, the device generates a memory image file using the captured memory image.

In operation 912, the device identifies working data utilized by the code function. The working data may include stored data or in-memory data. The working data may include input data, output data, intermediate data, temporary data, and the like. The working data may include data stored in local storage or remote storage. In operation 914, the device generates a working data file using the identified working data. The working data file may include the working data, one or more identifiers to a portion of the working data, one or more identifiers to storage locations associated with the working data, and the like.

In operation 916, the device may optionally collect metadata associated with the execution of the instance of the code function. The metadata may include information maintained by one or more applications. Some examples of information maintained by the applications may include code function management information, environment information (e.g., environment variables, path variables, profile information for the user executing an instance of a code function, and the location of data files associated with the instance), command-line information, arguments passed to the instances of the code functions, I/O information, and the like. In operation 918, the device generates a metadata file using the collected metadata.

According to one example of the present technology, the set of files may be aggregated to represent the code function checkpoint for the instance of the code function. The set of files may be aggregated as a group. In another example, the set of files may be merged to form a single file, for example, using a header and section separators to facilitate later parsing.

Figure 10:
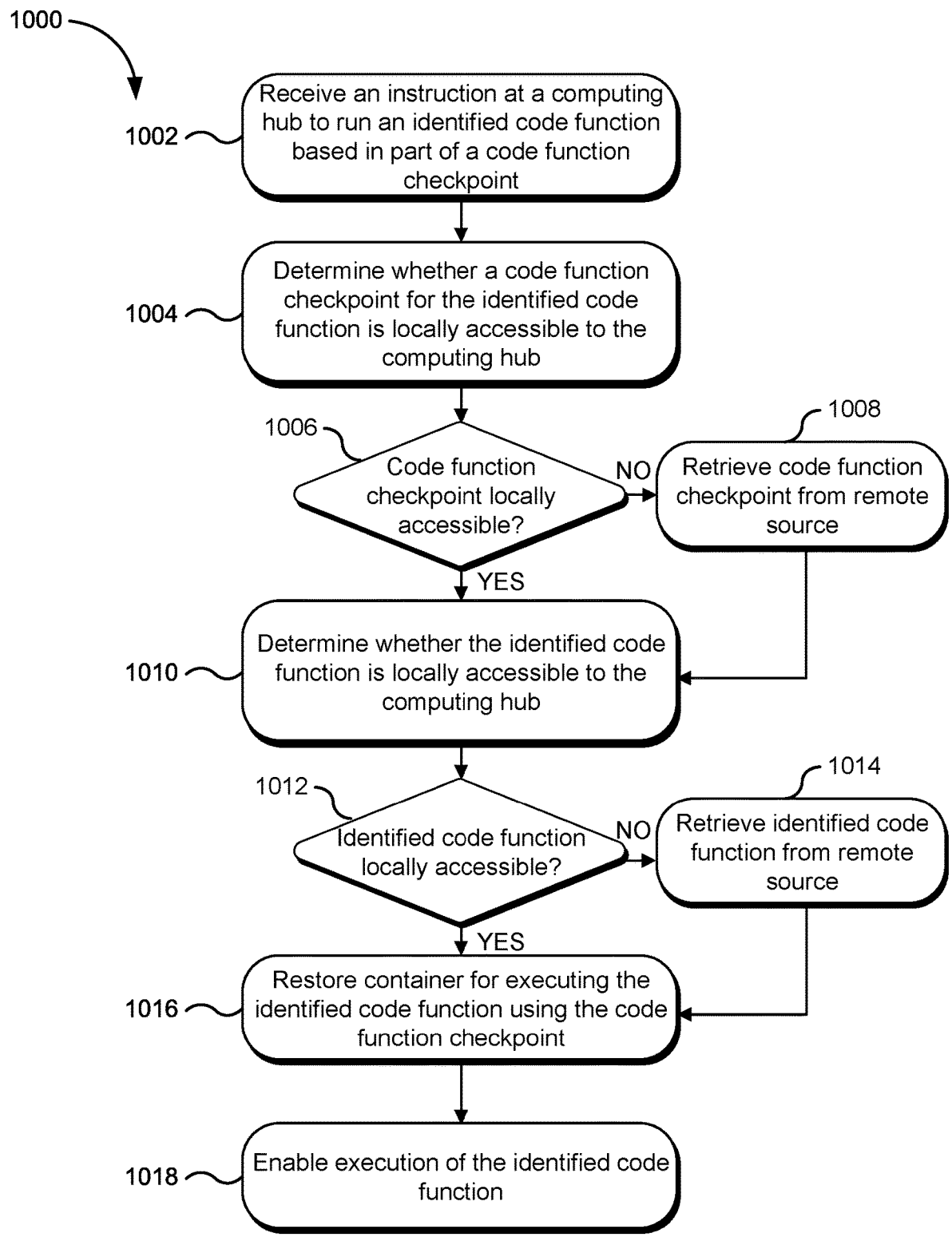
FIG. 10 is a flowchart of a method for resuming execution of a code function by a computing hub using a code function checkpoint according to an example of the present technology.

FIG. 10—Method for Resuming Execution of a Code Function Using a Code Function Checkpoint FIG. 10 is a flowchart of a method 1000 for resuming execution of a code function by a computing hub using a code function checkpoint according to an example of the present technology. The method 1000 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 1000 enables any computing hub in a group to resume the execution of a corresponding code function irrespective of when and where the code function was first instantiated or subsequently suspended.

In operation 1002, a computing hub receives an instruction to run (e.g., resume, restart, load, etc.) an identified code function based at least in part on a code function checkpoint. The instruction may include an identifier associated with the code function, an identifier associated with the code function checkpoint, the code function, or the code function checkpoint. The computing hub may receive the instruction directly from a manager that suspended execution of the code function, from a group master computing hub, from a scheduler coordinating execution of the code function, from a service provider environment, and the like.

In operation 1004, the computing hub determines whether a code function checkpoint for the identified code function is locally accessible to the computing hub. In operation 1006, if a determination is made in operation 1004 that the code function checkpoint for the identified code function is not locally accessible, the method 1000 proceeds to operation 1008 where the code function checkpoint for the identified code function is retrieved from a remote source. The code function checkpoint may be retrieved directly from the computing hub that suspended execution of the code function, from a group master computing hub, from a distributed checkpoint service coordinating replication of code function checkpoints between computing hubs, or from a service provider environment.

In operation 1006, if a determination is made in operation 1004 that the identified code function checkpoint is locally accessible, the method 1000 proceeds to operation 1010 where the computing hub determines whether the identified code function is locally accessible to the computing hub. In operation 1012, if a determination is made in operation 101 that the identified code function is not locally accessible, the method 1000 proceeds to operation 1014 where the identified code function is retrieved from a remote source. The identified code function may be retrieved directly from the computing hub that suspended execution of the code function, from a group master computing hub, from a scheduler coordinating execution of the code function, or from a service provider environment.

In operation 1012, if a determination is made in operation 1010 that the identified code function is locally accessible, the method 1000 proceeds to operation 1016 where the computing hub loads or re-creates a container for executing the identified code function using the code function checkpoint. The computing hub may establish the container utilizing processor state information, memory images, local data files, and the like. In operation 1018, the computing hub enables execution of the code function.

Figure 11:
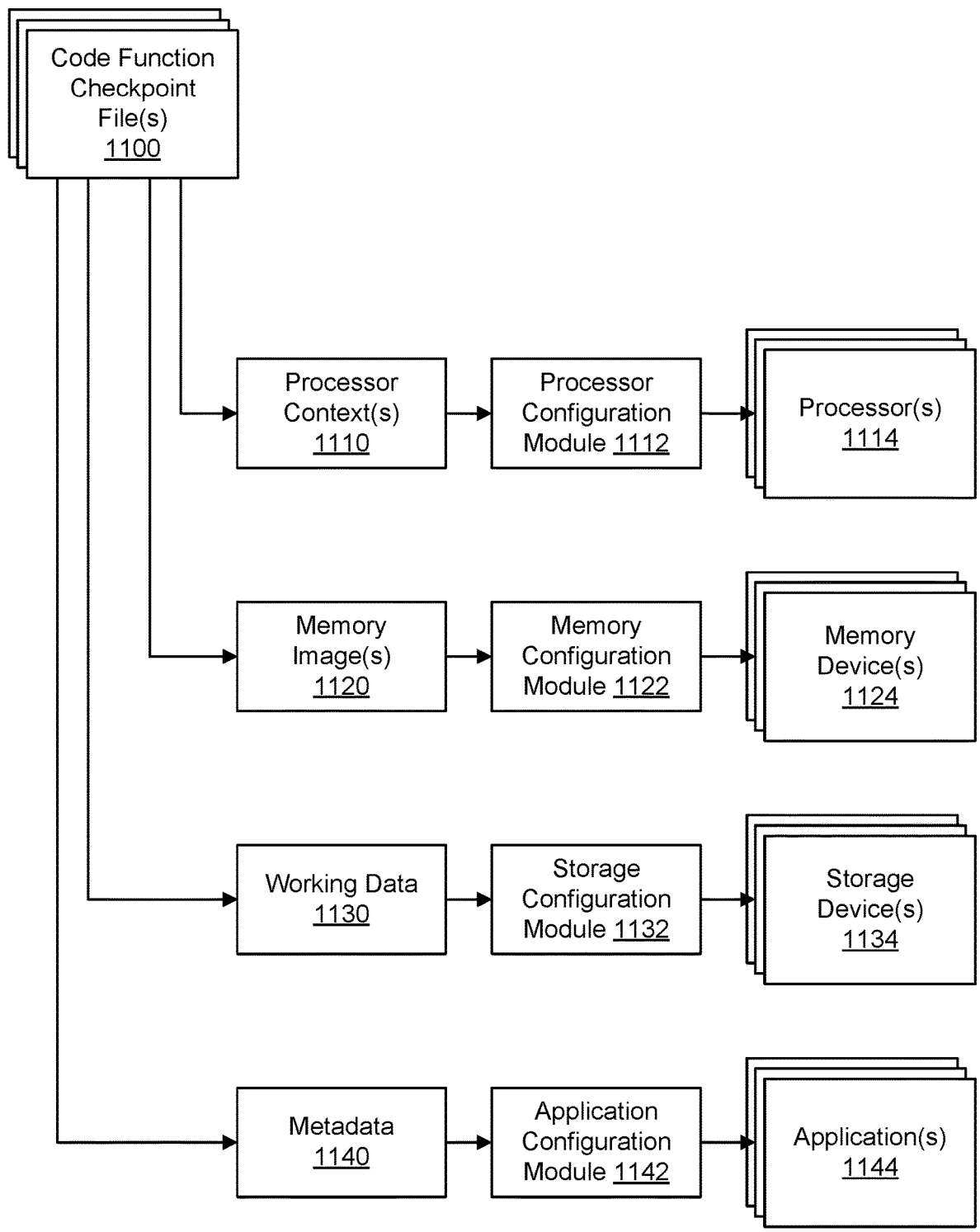
FIG. 11 is a block diagram of elements used for configuring a computing hub using a code function checkpoint according to an example of the present technology.

FIG. 11—Resource Configuration Using a Code Function Checkpoint

FIG. 11 is a block diagram of elements used for configuring a computing hub using a code function checkpoint according to an example of the present technology. In this example, a set of code function checkpoint file(s) 1100 may be used to configure (or reconfigure) one or more resources of the computing hub to resume execution of an instance of a code function corresponding to the code function checkpoint file(s) 1100. The code function checkpoint file(s) 1100 may include individual files providing processor context(s) 1110, memory image(s) 1120, working data 1130, and metadata 1140. In another example, the code function checkpoint file(s) 1100 may be parsed to identify the processor context(s) 1110, the memory image(s) 1120, the working data 1130, and the metadata 1140.

A processor configuration module 1112 may use the processor context(s) 1110 to configure one or more processor(s) 1114. The processor configuration module 1112 may include hardware and/or software elements that configure (or reconfigure) the context of a processor. The processor configuration module 1112 may configure the processor(s) 1114 with register values, program counters, stack pointers, and the like, obtained from the processor context(s) 1110. The processor configuration module 1112 may form part of a manager of a computing hub or a code function service of the computing hub.

A memory configuration module 1122 may use the memory image(s) 1120 to configure one or more memory device(s) 1124. The memory configuration module 1122 may include hardware and/or software elements that configure (or reconfigure) a memory system, such as the pages, address tables, virtual memory manager, etc. of the memory system. The memory configuration module 1122 may configure the memory device(s) 1124 with memory pages, shared memory, private memory, address mappings, and the like obtained from the memory image(s) 1120. The memory configuration module 1122 may form part of a manager of a computing hub or a code function service of the computing hub.

A storage configuration module 1132 may use the working data 1130 to configure one or more storage device(s) 1134. The storage configuration module 1132 may include hardware and/or software elements that configure (or reconfigure) a storage system, such as the inodes, file descriptors, folder descriptors, virtual storage manager, etc. of the storage system. The storage configuration module 1132 may configure the storage device(s) 1134 with working data, input data, temporary data, output data, and the like obtained from the working data 1130. The storage configuration module 1132 may form part of a manager of a computing hub or a code function service of the computing hub.

A metadata configuration module 1142 may use the metadata 1140 to configure one or more application(s) 1144. The metadata configuration module 1142 may include hardware and/or software elements that configure (or reconfigure) an application, such as information maintained by the application about the execution of an instance of a code function. The metadata configuration module 1142 may configure the application(s) 1144 with tracking information, log files, environment variables, command-line parameters, function arguments, worker information, and the like. The metadata configuration module 1142 may form part of a manager of a computing hub or a code function service of the computing hub.

Figure 12:
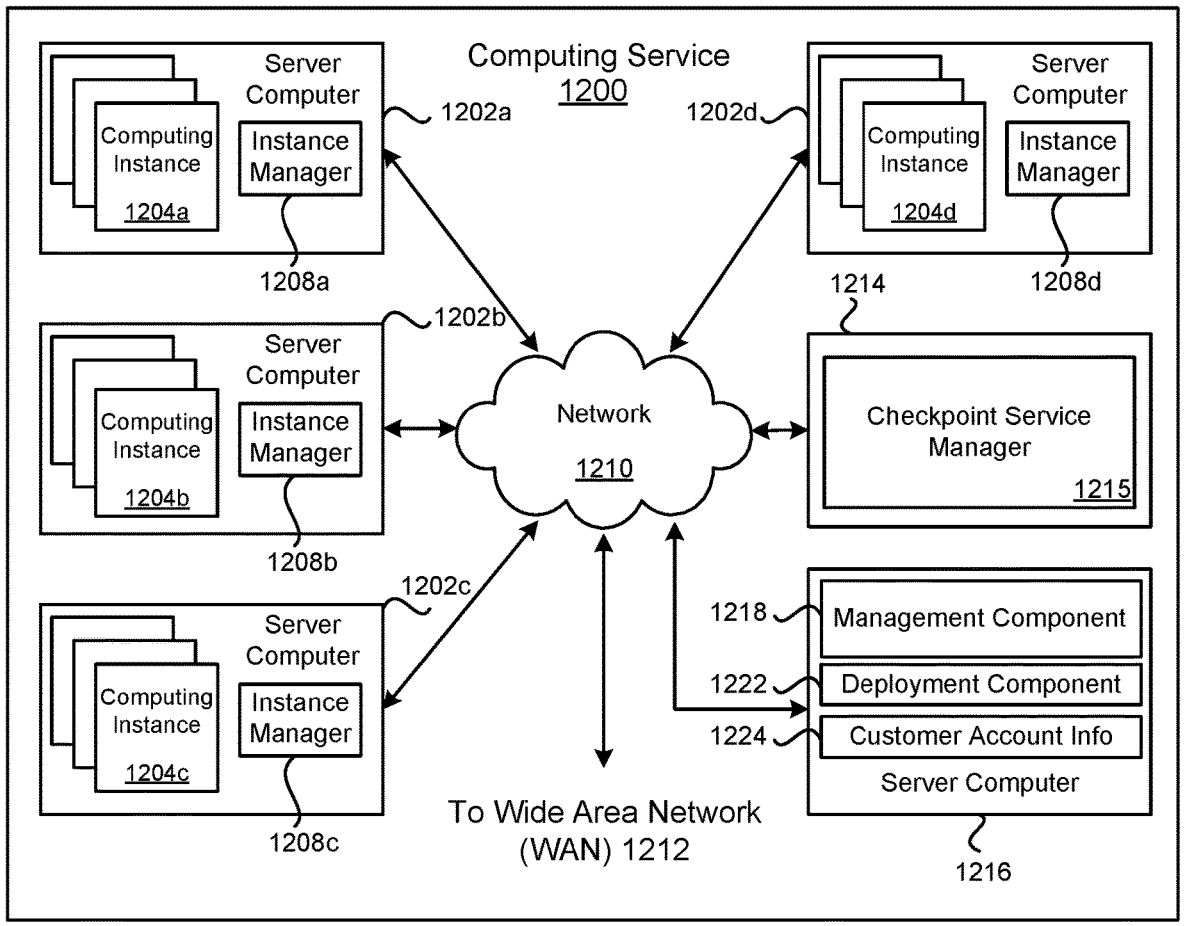
FIG. 12 is a block diagram of a service provider environment according to an example of the present technology.

FIG. 12—Example Computing Service

FIG. 12 is a block diagram illustrating an example computing service 1200 that may be used to execute and manage a number of computing instances 1204a-d upon which the present technology may execute. In particular, the computing service 1200 depicted illustrates one environment in which the technology described herein may be used. The computing service 1200 may be one type of environment that includes various virtualized service resources that may be used, for instance, to host computing instances 1204a-d.

The computing service 1200 may be capable of delivery of computing, storage and networking capacity as a software service to a community of end recipients. In one example, the computing service 1200 may be established for an organization by or on behalf of the organization. That is, the computing service 1200 may offer a "private cloud environment." In another example, the computing service 1200 may support a multi-tenant environment, wherein a plurality of customers may operate independently (i.e., a public cloud environment). Generally speaking, the computing service 1200 may provide the following models: Infrastructure as a Service ("IaaS"), Platform as a Service ("PaaS"), and/or Software as a Service ("SaaS"). Other models may be provided. For the IaaS model, the computing service 1200 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1200. End customers may access the computing service 1200 using networked client devices, such as desktop computers, laptops, tablets, smartphones, etc. running web browsers or other lightweight client applications, for example. Those familiar with the art will recognize that the computing service 1200 may be described as a "cloud" environment.

The particularly illustrated computing service 1200 may include a plurality of server computers 1202a-d. The server computers 1202a-d may also be known as physical hosts. While four server computers are shown, any number may be used, and large data centers may include thousands of server computers. The computing service 1200 may provide computing resources for executing computing instances 1204a-d. In one example, computing instances 1204a-d may be virtual machines. A virtual machine may be an instance of a software implementation of a machine (i.e., a computer) that executes applications like a physical machine. In the example of a virtual machine, each of the server computers 1202a-d may be configured to execute an instance manager 1208a-d capable of executing the instances. The instance manager 1208a-d may be a hypervisor, virtual machine manager (VMM), or another type of program configured to enable the execution of multiple computing instances 1204a-d on a single server. Additionally, each of the computing instances 1204a-d may be configured to execute one or more applications.

A server computer 1214 may be reserved to execute software components for implementing the present technology or managing the operation of the computing service 1200 and the computing instances 1204a-d. For example, the server computer 1214 may execute a checkpoint service manager 1215 operable to manage distribution of code function checkpoints between one or more computing hubs in a computing hub group. The checkpoint service manager 1215 may receive a code function checkpoint and determine one or more recipients for duplication. As a result, the checkpoint service manager 1215 may enable the code function checkpoints to be resumed on any computing hub in the group of computing hubs.

A server computer 1216 may execute a management component 1218. A customer may access the management component 1218 to configure various aspects of the operation of the computing instances 1204a-d purchased by a customer. For example, the customer may setup computing instances 1204a-d and make changes to the configuration of the computing instances 1204a-d.

A deployment component 1222 may be used to assist customers in the deployment of computing instances 1204a-d. The deployment component 1222 may have access to account information associated with the computing instances 1204a-d, such as the name of an owner of the account, credit card information, country of the owner, etc. The deployment component 1222 may receive a configuration from a customer that includes data describing how computing instances 1204a-d may be configured. For example, the configuration may include an operating system, provide one or more applications to be installed in computing instances 1204a-d, provide scripts and/or other types of code to be executed for configuring computing instances 1204a-d, provide cache logic specifying how an application cache is to be prepared, and include other types of information. The deployment component 1222 may utilize the customer-provided configuration and cache logic to configure, prime, and launch computing instances 1204a-d. The configuration, cache logic, and other information may be specified by a customer accessing the management component 1218 or by providing this information directly to the deployment component 1222.

Customer account information 1224 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1224 may also include security information used in encryption of asynchronous responses to API requests. By "asynchronous" it is meant that the API response may be made at any time after the initial request and with a different network connection.

A network 1210 may be utilized to interconnect the computing service 1200 and the server computers 1202*a-d*, 1216. The network 1210 may be a local area network (LAN) and may be connected to a Wide Area Network (WAN) 1212 or the Internet, so that end customers may access the computing service 1200. In addition, the network 1210 may include a virtual network overlaid on the physical network to provide communications between the server computers 1202*a-d*. The network topology illustrated in FIG. 12 has been simplified, as many more networks and networking devices may be utilized to interconnect the various computing systems disclosed herein.

Figure 13:
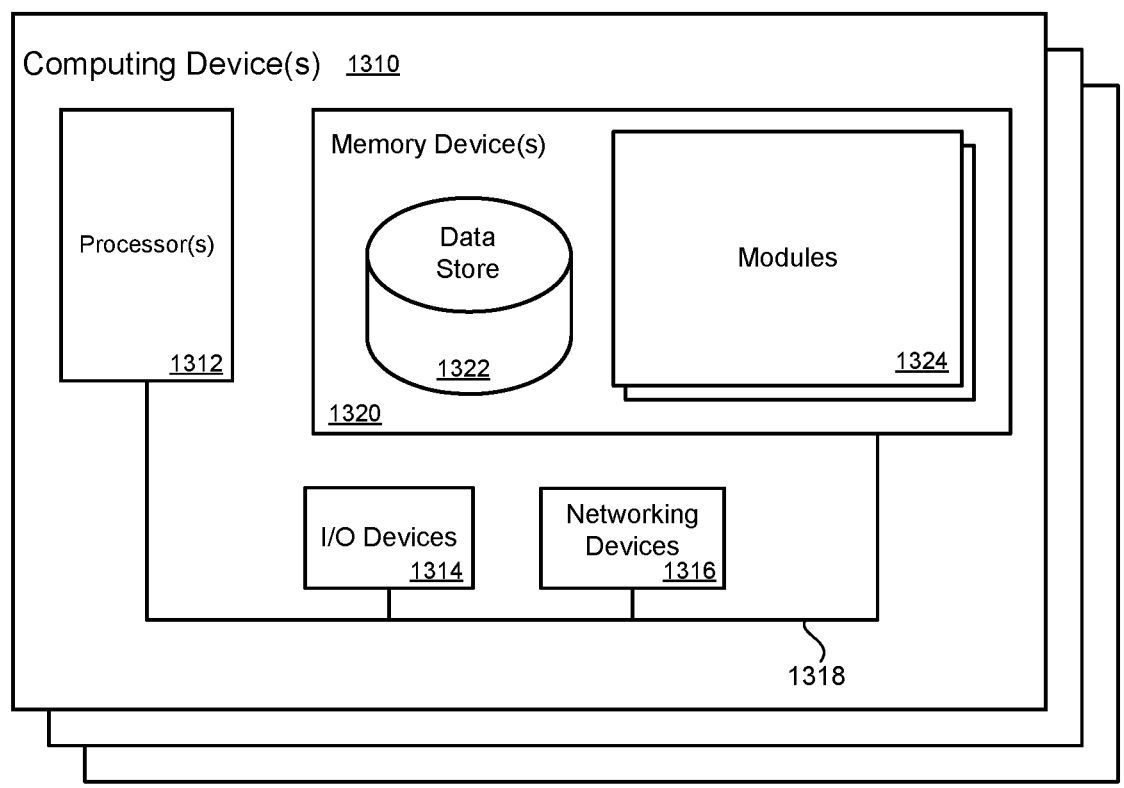
FIG. 13 is a block diagram that provides an example illustration of a computing device that may be employed in the present technology.

FIG. 13—Example Computing Device

FIG. 13 illustrates one or more computing device(s) 1310 on which modules or code components of this technology may execute. A first computing device 1310 is illustrated on which a high-level example of the technology may be executed. The first computing device 1310 may include one or more processor(s) 1312 that are in communication with memory device(s) 1320. The computing device may include a local communication interface 1318 for the components in the computing device. For example, the local communication interface may be a local data bus and/or any related address or control busses as may be desired.

The memory device(s) 1320 may contain modules 1324 or code components that are executable by the processor(s) 1312 and data for the modules 1324. The modules 1324 may execute the functions described earlier. A data store 1322 may also be located in the memory device(s) 1320 for storing data related to the modules 1324 and other applications along with an operating system that is executable by the processor(s) 1312.

Other applications may also be stored in the memory device(s) 1320 and may be executable by the processor(s) 1312. Components or modules discussed in this description that may be implemented in the form of software using high programming level languages that are compiled, interpreted, or executed using a hybrid of the methods.

The computing device may also have access to I/O (input/output) devices 1314 that are usable by the computing devices. An example of an I/O device is a display screen that is available to display output from the computing devices. Other known I/O device may be used with the computing device as desired. The networking devices 1316 and similar communication devices may be included in the computing device. The networking devices 1316 may be wired or wireless networking devices that connect to the internet, a LAN, WAN, or other computing network.

The components or modules that are shown as being stored in the memory device(s) 1320 may be executed by the processor(s) 1312. The term "executable" may mean a program file that is in a form that may be executed by a processor(s) 1312. For example, a program in a higher-level language may be compiled into machine code in a format that may be loaded into a random-access portion of the memory device(s) 1320 and executed by the processor(s) 1312. In another example, source code may be loaded by another executable program and interpreted to generate instructions in a random access portion of the memory to be executed by a processor. The executable program may be stored in any portion or component of the memory device(s) 1320. For example, the memory device(s) 1320 may be random access memory (RAM), read only memory (ROM), flash memory, a solid-state drive, memory card, a hard drive, optical disk, floppy disk, magnetic tape, or any other memory components.

The processor(s) 1312 may represent multiple processors and the memory 1320 may represent multiple memory units that operate in parallel to the processing circuits. This may provide parallel processing channels for the processes and data in the system. The local communication interface 1318 may be used as a network to facilitate communication between any of the multiple processors and multiple memories. The local communication interface 1318 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to emphasize more particularly their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may comprise, for instance, one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules, and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
   at least one processor; and
   at least one memory device including instructions that, when executed by the at least one processor, cause the system to:
   receive a code function checkpoint at a checkpoint service hosted in a service provider environment of a plurality of computing environments, wherein the code function checkpoint includes at least execution instructions and an execution state for an instance of a code function executing in a source computing environment of the plurality of computing environments, and wherein the plurality of computing environments includes a computing hub included in a local network;
   store the code function checkpoint to allow retrieval and distribution of the code function checkpoint;
   determine, from among the plurality of computing environments, a destination computing environment to which to send the code function checkpoint, wherein the destination computing environment is determined based at least in part on one or more criteria for resuming execution of the code function; and
   send the code function checkpoint to the destination computing environment to allow the execution instructions and the execution state included in the code function checkpoint to be used to resume execution of the code function at the destination computing environment.

2. The system as in claim 1, wherein the at least one memory device includes further instructions that, when executed by the at least one processor, cause the system to further determine that the destination computing environment satisfies a condition for resuming execution of the code function in the destination computing environment or satisfies one or more rules defining when to resume execution of the code function in the destination computing environment.

3. The system as in claim 1, wherein the destination computing environment is the computing hub included in the local network that has a set of connected devices which connect to the computing hub to access services provided by the computing hub.

4. The system as in claim 1, wherein the destination computing environment is a computing instance in the service provider environment.

5. The system as in claim 1, wherein the code function checkpoint further includes a processor context of a processor utilized during execution of the code function and a memory image of one or more memory pages of a memory utilized during the execution of the code function.

6. The system as in claim 5, wherein after receiving the code function checkpoint at the destination computing environment, a code function service is programmed to:
   configure a processor in the destination computing environment using the processor context included in the code function checkpoint;
   configure a memory in the destination computing environment using the memory image included in the code function checkpoint; and
   instruct the processor to resume execution of the code function.

7. The system as in claim 1, wherein the code function checkpoint is stored by a storage service hosted in the service provider environment.

8. A method, comprising:
   receiving a code function checkpoint at a checkpoint service hosted in a service provider environment of a plurality of computing environments, wherein the code function checkpoint includes execution instructions and an execution state for an instance of a code function, wherein the plurality of computing environments includes a computing hub included in a local network, and wherein the local network has a set of connected devices that connect to the computing hub to access services provided by the computing hub;

storing the code function checkpoint to allow retrieval and distribution of the code function checkpoint;

identifying, from among the plurality of computing environments, the computing hub included in the local network as a destination to which to send the code function checkpoint, wherein the computing hub is identified based at least in part on one or more criteria for resuming execution of the code function; and sending the code function checkpoint to the computing hub to allow the execution instructions and the execution state included in the code function checkpoint to be used to resume execution of the code function on the computing hub.

9. The method as in claim 8, wherein identifying the computing hub comprises determining that a set of metrics associated with the computing hub satisfies a condition for resuming execution of the code function on the computing hub.

10. The method as in claim 8, wherein identifying the computing hub comprises determining that a set of metrics associated with the computing hub satisfies one or more rules defining when to resume execution of the code function.

11. The method as in claim 8, wherein identifying the computing hub comprises determining that the computing hub that generated the code function checkpoint is able to resume execution of the code function on the computing hub.

12. The method as in claim 8, wherein identifying the computing hub is responsive to determining that a source computing hub in the local network that generated the code function checkpoint is not able to resume execution of the code function on the source computing hub.

13. The method as in claim 8, wherein the code function checkpoint is generated in response to at least one of:
  determining that execution of the instance of the code function entered a predetermined state of execution;
  determining that a time during execution of the instance of the code function satisfies a checkpoint schedule for long-lived code functions;
  determining that utilization of one or more computing resources used to execute the instance of the code function satisfies a usage threshold; or
  receiving an instruction to suspend execution of the instance of the code function.

14. The method as in claim 8, wherein generating the code function checkpoint comprises:
  constructing a processor context for a processor utilized to execute the instance of the code function;
  capturing a memory image of a memory device utilized to execute the instance of the code function;
  retrieving data from a storage device utilized to execute the instance of the code function; and
  generating a plurality of files based at least in part on the processor context, the memory image, and the data.

15. The method as in claim 8, wherein storing the code function checkpoint comprises storing the code function checkpoint using at least one of: a local storage service of the computing hub, a storage service accessible to the computing hub over a local area network (LAN), or a storage service hosted by the service provider environment accessible to the computing hub over a computer network.

16. The method as in claim 8, wherein the code function is to be instantiated in a container hosted by the computing hub in the local network.

17. A non-transitory machine readable storage medium including instructions embodied thereon, wherein the instructions, when executed by at least one processor:
  receive a code function checkpoint at a checkpoint service in a service provider environment of a plurality of computing environments, wherein the code function checkpoint includes at least execution instructions and an execution state for an instance of a code function, and wherein the plurality of computing environments includes a computing hub included in a local network;
  store the code function checkpoint to allow retrieval and distribution of the code function checkpoint;
  identify, from among the plurality of computing environments, a code function service hosted in the service provider environment to which to send the code function checkpoint, wherein the code function service is identified based at least in part on one or more criteria for resuming execution of the code function, and wherein the code function service is configured to instantiate the code function using the code function checkpoint; and
  send the code function checkpoint to the code function service to allow the code function service to instantiate the code function and resume execution using the execution instructions and the execution state included in the code function checkpoint.

18. The non-transitory machine readable storage medium as in claim 17, wherein identification of the code function service hosted in the service provider environment is responsive to a determination that a computing hub that generated the code function checkpoint is not available to resume execution of the code function on the computing hub.

19. The non-transitory machine readable storage medium as in claim 17, further comprising instructions that, when executed by the at least one processor:
  retrieve the code function checkpoint stored to at least one of: a storage service hosted by the service provider environment, a local storage service of a computing hub that generated the code function checkpoint, a storage service accessible to the computing hub over a local area network (LAN).

20. The non-transitory machine readable storage medium as in claim 17, wherein the code function service hosted in the service provider environment is programmed to:
  configure a processor in the service provider environment using a processor context included in the code function checkpoint;
  configure a memory in the service provider environment using a memory image included in the code function checkpoint; and
  instruct the processor to resume execution of the code function.

* * * * *